(12) United States Patent
Totty et al.

(10) Patent No.: US 11,721,067 B2
(45) Date of Patent: *Aug. 8, 2023

(54) SYSTEM AND METHOD FOR VIRTUAL MODELING OF INDOOR SCENES FROM IMAGERY

(71) Applicant: Geomagical Labs, Inc., Mountain View, CA (US)

(72) Inventors: Brian Totty, Mountain View, CA (US); Kevin Wong, Mountain View, CA (US); Jianfeng Yin, Mountain View, CA (US); Luis Puig Morales, Mountain View, CA (US); Paul Gauthier, Mountain View, CA (US); Salma Jiddi, Mountain View, CA (US); Qiqin Dai, Mountain View, CA (US); Brian Pugh, Mountain View, CA (US); Konstantinos Nektarios Lianos, Mountain View, CA (US); Angus Dorbie, Mountain View, CA (US); Yacine Alami, Mountain View, CA (US); Marc Eder, Mountain View, CA (US); Christopher Sweeney, Mountain View, CA (US); Javier Civera, Mountain View, CA (US)

(73) Assignee: Geomagical Labs, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/488,305

(22) Filed: Sep. 29, 2021

(65) Prior Publication Data
US 2022/0020210 A1 Jan. 20, 2022

Related U.S. Application Data

(63) Continuation of application No. 16/823,123, filed on Mar. 18, 2020, now Pat. No. 11,170,569.
(Continued)

(51) Int. Cl.
*G06T 17/05* (2011.01)
*G06T 7/174* (2017.01)
(Continued)

(52) U.S. Cl.
CPC ............... *G06T 17/05* (2013.01); *G06T 5/50* (2013.01); *G06T 7/174* (2017.01); *G06T 7/50* (2017.01);
(Continued)

(58) Field of Classification Search
None
See application file for complete search history.

(56) References Cited

U.S. PATENT DOCUMENTS

| | | |
|---|---|---|
| 9,240,077 B1 | 1/2016 | Kraft et al. |
| 10,832,487 B1 | 11/2020 | Ulbricht et al. |

(Continued)

*Primary Examiner* — Yanna Wu
(74) *Attorney, Agent, or Firm* — Amardeep S. Grewal; Reed Smith LLP

(57) ABSTRACT

A method and system for generating a virtual representation of a physical scene, including receiving scene data corresponding to the physical scene, processing the scene data to determine scene components and scene priors corresponding to the scene components, generating, by a plurality of neural networks, dense geometric representations based at least in part on the scene priors, where each dense geometric representation corresponds to a scene component in the scene components, generating a virtual model of the physical scene based at least in part on the dense geometric representations, and generating a virtual representation of the
(Continued)

physical scene based at least in part on the scene data, the virtual representation being aligned with the virtual model.

21 Claims, 8 Drawing Sheets

Related U.S. Application Data

(60) Provisional application No. 62/819,817, filed on Mar. 18, 2019.

(51) Int. Cl.
  *G06T 7/50* (2017.01)
  *G06T 5/50* (2006.01)
(52) U.S. Cl.
  CPC ............ *G06T 2207/10028* (2013.01); *G06T 2207/20084* (2013.01); *G06T 2207/20221* (2013.01)

(56) References Cited

U.S. PATENT DOCUMENTS

| | | |
|---|---|---|
| 2008/0071559 A1 | 3/2008 | Arrasvuori |
| 2011/0213664 A1 | 9/2011 | Osterhout et al. |
| 2015/0325040 A1 | 11/2015 | Stirbu |
| 2015/0356774 A1 | 12/2015 | Gal et al. |
| 2017/0032348 A1 | 2/2017 | Matthews et al. |
| 2017/0076490 A1 | 3/2017 | Jenkins |
| 2017/0168559 A1 | 6/2017 | Jayadevaprakash et al. |
| 2017/0169617 A1 | 6/2017 | Rodriguez |
| 2017/0243352 A1 | 8/2017 | Kutliroff et al. |
| 2017/0323481 A1 | 11/2017 | Tran et al. |
| 2017/0323488 A1 | 11/2017 | Mott et al. |
| 2018/0018553 A1 | 1/2018 | Bach et al. |
| 2018/0095616 A1 | 4/2018 | Valdivia et al. |
| 2018/0112978 A1 | 4/2018 | Burton et al. |
| 2018/0180071 A1 | 6/2018 | Fuhrmann |
| 2019/0026957 A1 | 1/2019 | Gausebeck |
| 2019/0080516 A1 | 3/2019 | Petrovskaya et al. |
| 2020/0051320 A1 | 2/2020 | Laffont et al. |
| 2020/0081249 A1 | 3/2020 | Brusnitsyn |
| 2020/0082198 A1 | 3/2020 | Yao et al. |
| 2020/0226820 A1* | 7/2020 | Stachniak ............ G06T 15/205 |

* cited by examiner

SYSTEM AND METHOD FOR VIRTUAL MODELING OF INDOOR SCENES FROM IMAGERY

CROSS-REFERENCE TO RELATED APPLICATIONS

This application is a continuation of U.S. Nonprovisional patent application Ser. No. 16/823,123 filed Mar. 18, 2020, which itself claims priority to U.S. Provisional Application No. 62/819,817 filed Mar. 18, 2019, the disclosures of which are hereby incorporated by reference in their entirety.

BACKGROUND

Generating an accurate and believable virtual model of an indoor space is oftentimes desirable, as accurate virtual models can be used in many applications, including Augmented Reality (AR) and Virtual Reality (VR), home improvement and interior design, indoor robotics, real estate visualization, architecture and modeling, and more.

While generating an accurate and believable virtual model of an indoor space from everyday imagery (also known as indoor perception or indoor 3D reconstruction) is highly desirable, such indoor perception is a known hard problem for computer vision without specialized hardware. Conventional, passive, photographic three-dimensional (3D) computer vision methods typically fail indoors for three reasons. First, most popular 3D reconstruction techniques are based on the detection and matching of visually distinctive small visual patches (e.g., features, keypoints, or other visually distinctive patches), and triangulating them as the camera moves. These techniques do not work well in most indoor environments (which tend to be dominated by blank walls and ceilings, uniform visual texture, repeating visual patterns from man-made objects, transparent or reflective surfaces, and viewpoint variant lighting), because there tends to be a severe scarcity of distinctive visual features on the most salient surfaces. Second, indoor perception is made more challenging due to the lighting conditions of indoor environments which can have light levels which are orders of magnitude darker than outdoor environments. Low light conditions can inject digital camera sensor noise and motion blur into photography that further hinders the success of visual patch triangulation techniques by damaging any subtle texture present in the scene. Third, conventional 3D keypoint triangulation computer vision algorithms often ignore other important salient details that humans readily use for indoor perception. These include architectural wall seams and perspective lines, shadows and illumination shapes, piecewise planar regions and segmentation boundaries, known objects, known scales and relationships, gravity, and other essential semantics of the scene.

Furthermore, today's consumer tools aren't adequate for mass-scale virtual modeling of indoor spaces. Images and videos, including 360-degree images, do not provide accurate, 3D-aware models of a room. Users may opt to produce their own computer-aided design (CAD) models using simple architectural modeling tools. This is laborious and impractical for modeling the fine details of complex architecture or furnishing, and it fails to provide realistic room imagery or perceptual realism. Professional architectural CAD services can be used to manually create and render synthetic CGI models of indoor spaces, but these services are expensive and require a significant lead time (e.g., hundreds or thousands of dollars and days or weeks of delay). Finally, live AR applications can provide an acceptable 3D rendering of virtual objects floating over live video of the environment. However, the user must be physically standing in the room while holding the interaction device, which limits usage and functionality of the model; in particular, the physical collocation constraint precludes users from using their room models in other locations and on other devices. Furthermore, by requiring a real- or near-real time (e.g., 30 frames per second (FPS) or other FPS) performance constraint on mobile devices, the quality and detail of model construction is severely restricted.

Thus, there is a need in the computer vision field to create new and useful systems and methods for providing practical, consumer-scale, indoor modeling, which can yield both 3D room geometry, combined with photorealistic photography, without requiring adoption of specialized hardware. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 2:
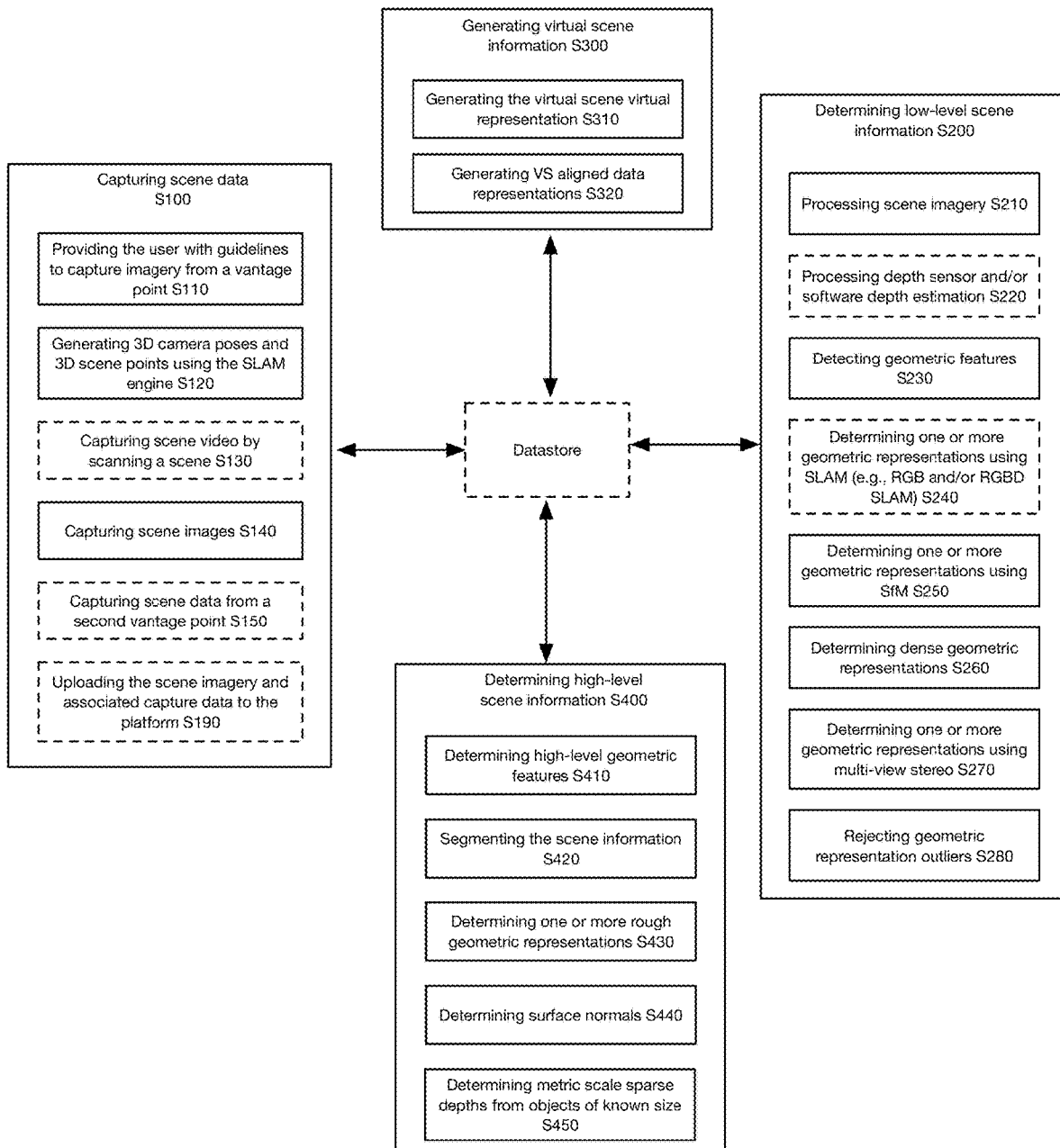
FIG. 2 is a schematic representation of the method.
Figure 3:
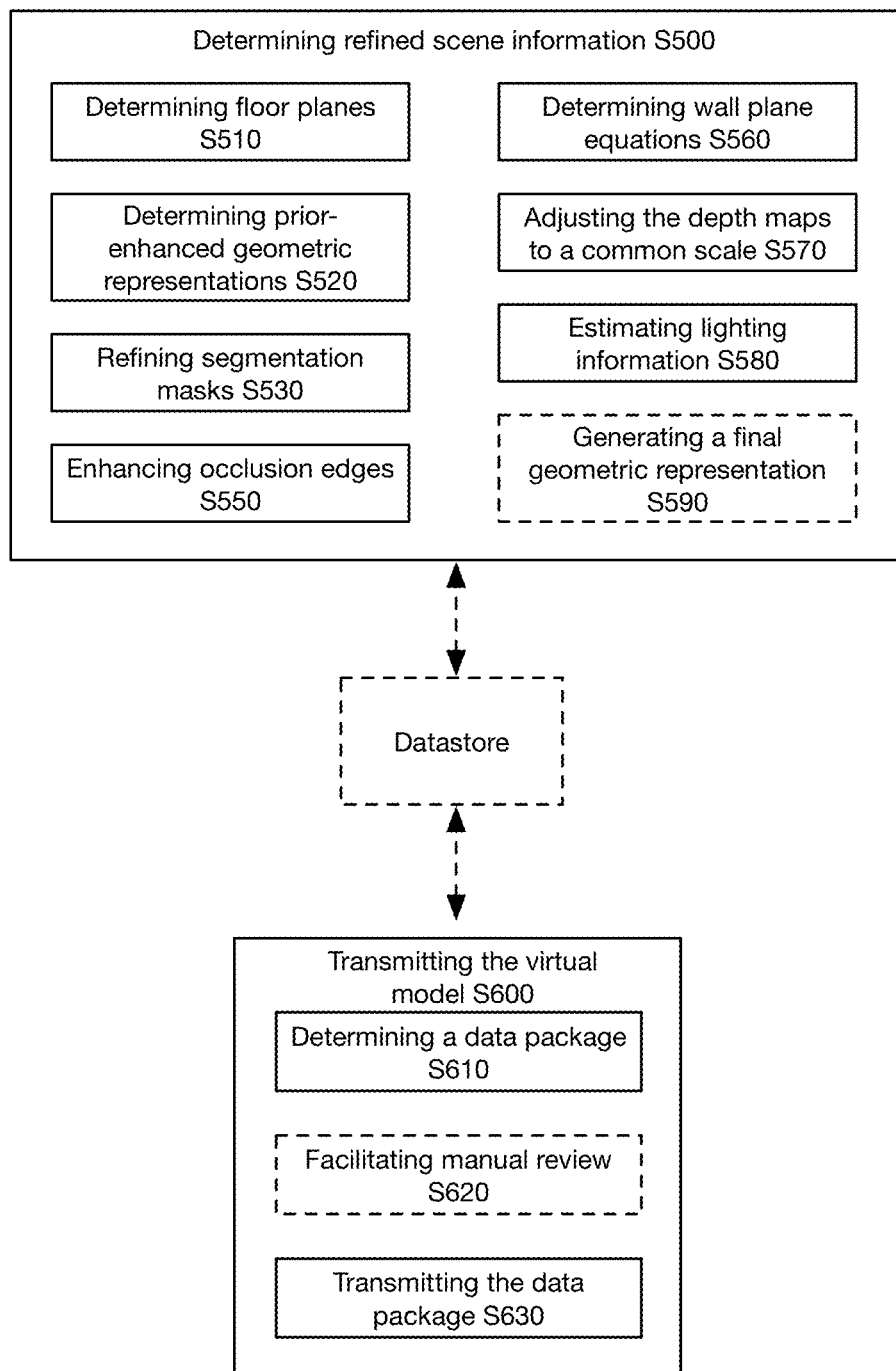
FIG. 3 is a schematic representation of the method.
Figure 7:
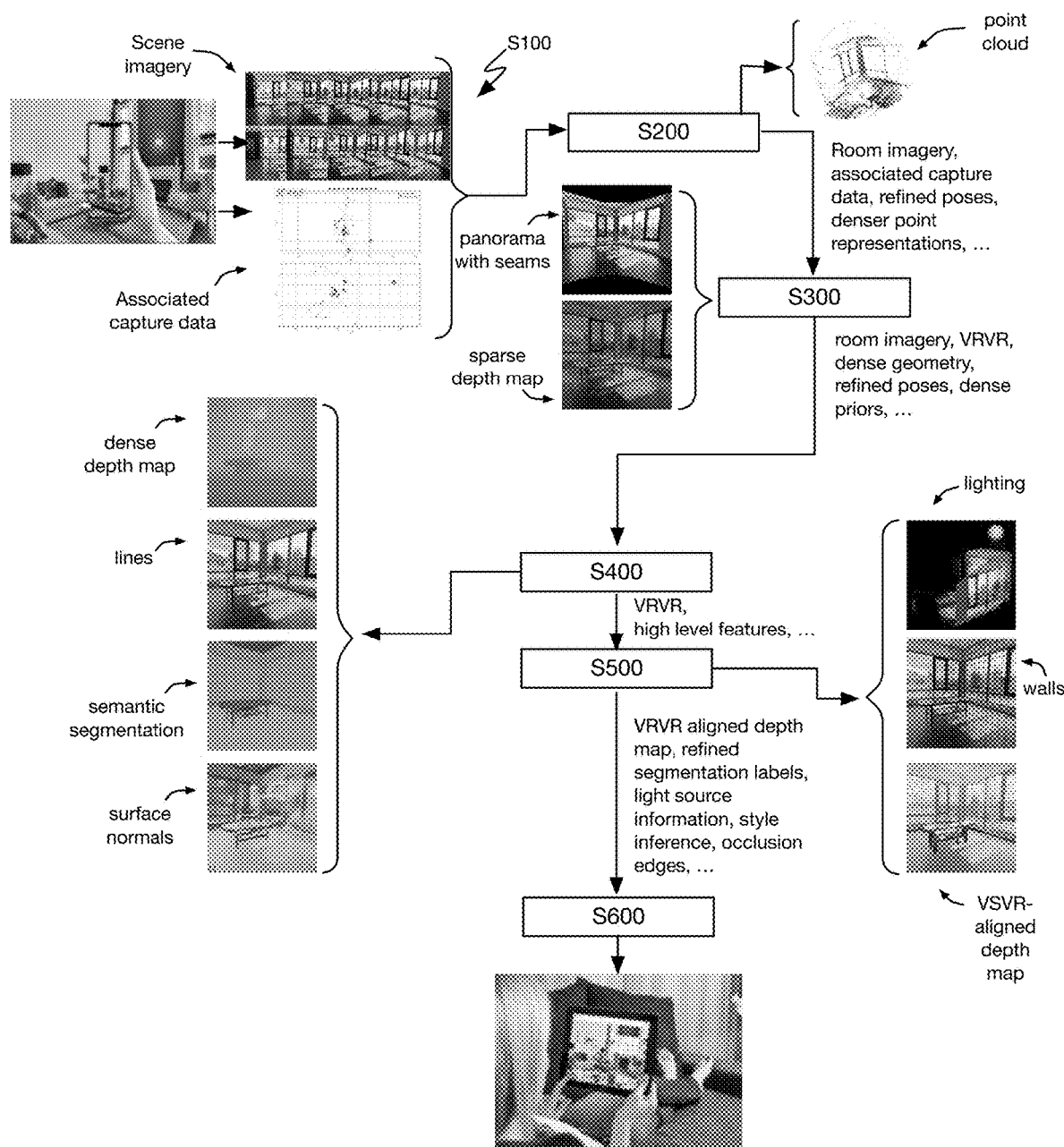
FIG. 7 is a variant of the method.

As shown in FIGS. 2-3, a method for providing virtual models of indoor scenes can include: capturing scene data S100, determining low-level scene information S200, generating virtual scene information S300, determining high-level scene information S400, determining refined scene information S500, and transmitting the virtual model S600, but can additionally or alternatively include any other suitable elements. An example of the method is depicted in FIG. 7.

Figure 1:
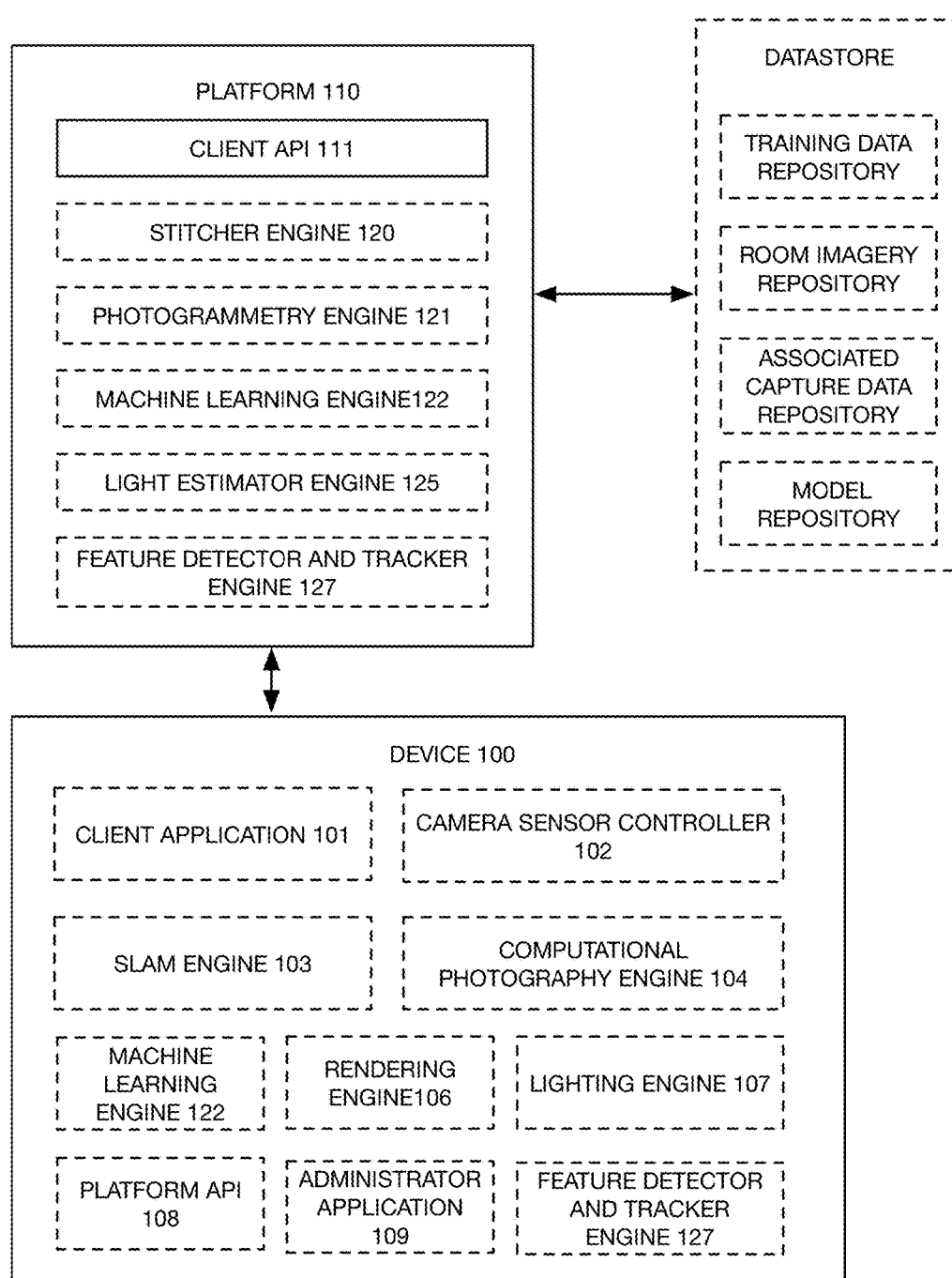
FIG. 1 is a schematic representation of the system.

As shown in FIG. 1, a system for providing virtual models of indoor scenes can include: a platform 110, one or more devices, one or more engines, one or more repositories, and/or any other suitable elements.

Figure 4:
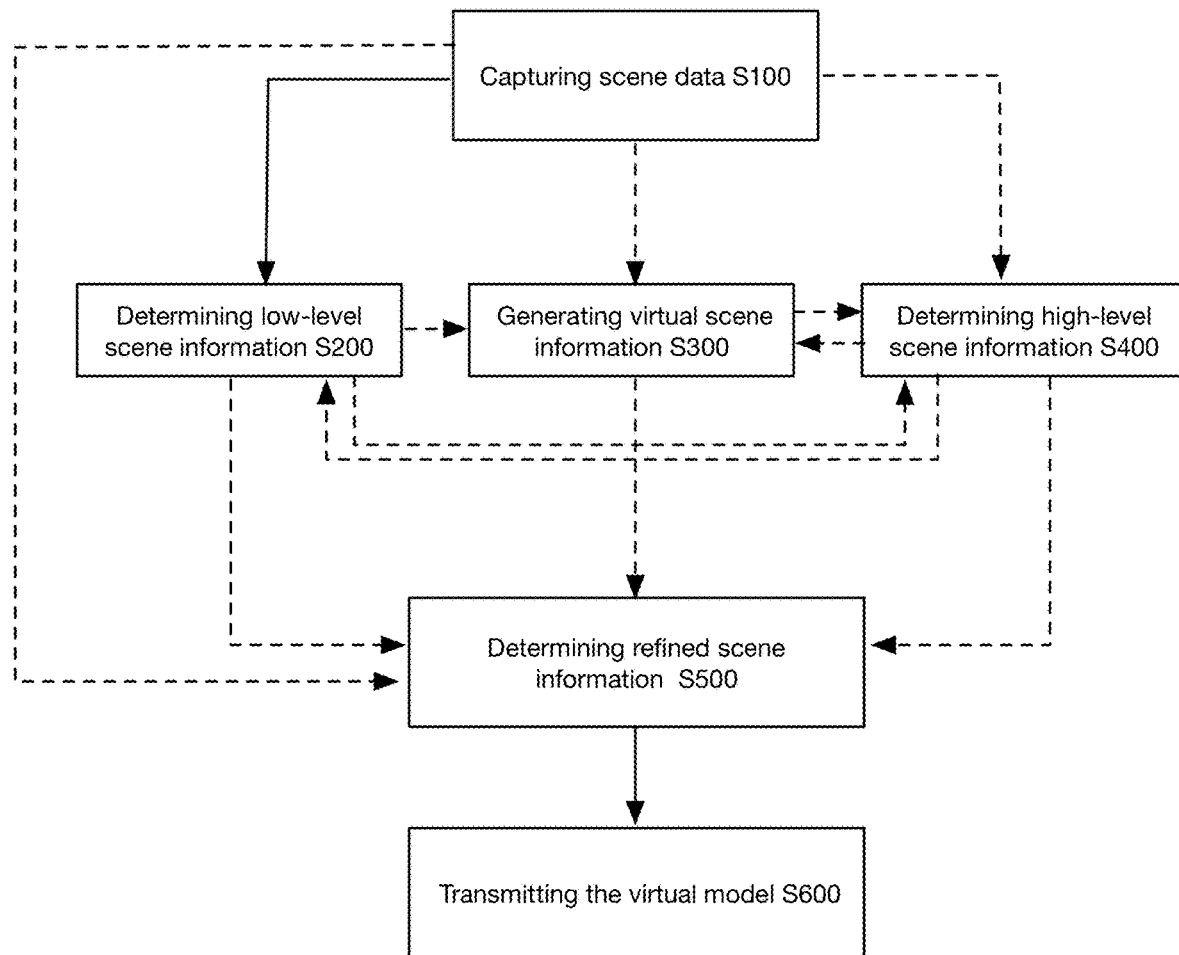
FIG. 4 is an embodiment of the method.

In a first example of the system and/or method, as shown in FIG. 4: the scene data from S100 can be used in S200, S300, S400, and/or S500; the virtual scene information from S200 can be used in S300, S400, S500, and/or S600; the visual scene information from S300 can be used in S400, S500, and/or S600; the high-level scene information from S400 can be used in S200, S300, S500, and/or S600; and the refined scene information from S500 can be used in S600.

Figure 5:
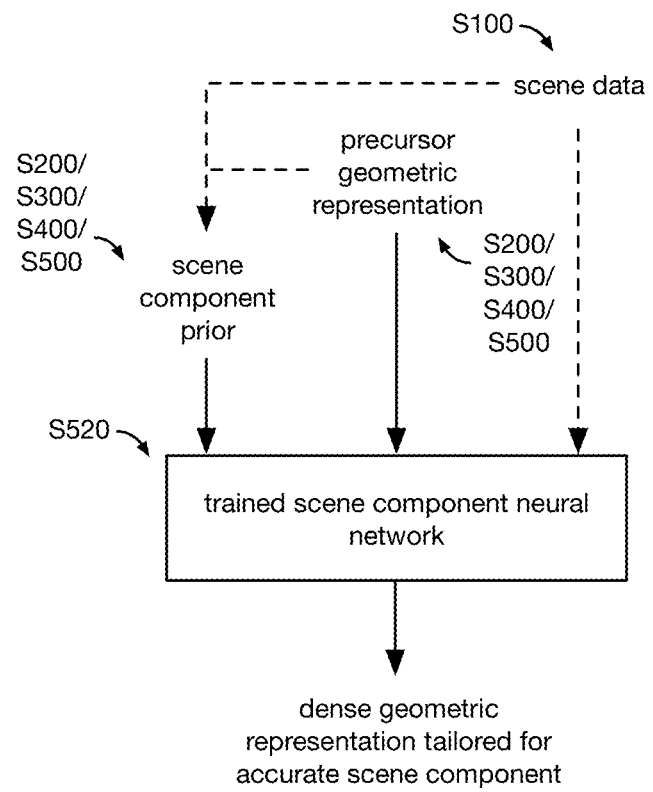
FIG. 5 is an embodiment of the method.

In a second example of the system and/or method, as shown in FIG. 5, the method can include: generating a precursor geometric representation and/or a scene prior from the scene data; and determining a geometric representation tailored for determining an accurate scene component using a trained scene component neural network. The scene component neural network can be trained based on one or more scene priors associated with the component. The scene component neural network can be biased with scene priors associated with the component (e.g., as an input) during inference.

Figure 6:
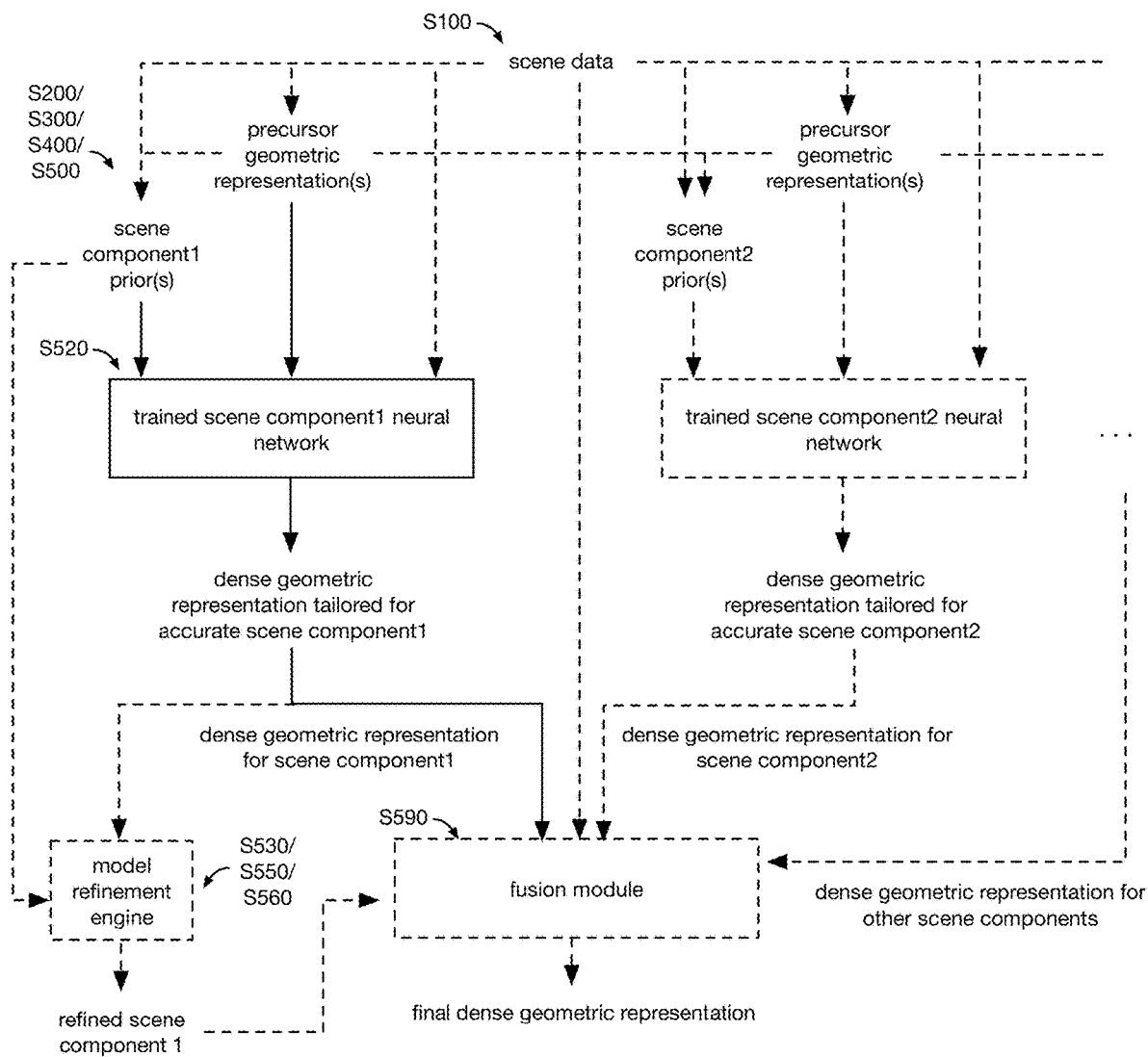
FIG. 6 is an embodiment of the method.

In a third example of the system and/or method, as shown in FIG. 6, the above elements, as described for FIG. 5, can be used to determine multiple dense geometric representations, each tailored to a respective scene component, by biasing a set of scene component neural networks with a respective scene component prior. The dense geometric representations, and optionally the scene data, can be fused using a fusion module to determine the final dense geometric representation.

2. BENEFITS

This method can confer several benefits over conventional methods for generating a virtual room model from imagery.

First, the method is neither time intensive nor energy intensive. In one embodiment, a virtual model of a room will be generated in a time frame on the order of seconds or minutes, rather than days or weeks. Furthermore, in various embodiments, the method is computer automated or near-automated, thus drastically reducing the time to completion. In examples, the duration between image sampling to model generation (and/or use) can be less than a week, less than a day, less than a threshold number of hours (e.g., 48 hours, 10 hours, 5 hours, 1 hour, or any other suitable number of hours), less than a threshold number of minutes (e.g., 120 minutes, 60 minutes, 30 minutes, 10 minutes, 5 minutes, or any other suitable number of minutes), less than a threshold number of seconds (e.g., 60 seconds, 30 seconds, 15 seconds, 1 second, etc.), or be any other suitable duration.

Second, the method detects the geometry of a room from images, which can be used in many applications, such as AR or VR, home improvement and interior design, indoor robotics, real estate visualization, architecture and modeling, and other applications.

Third, the method can be performed with minimum burden or effort on the part of a user. In particular, no laborious measurements or CAD interaction duties need to be taken manually by the end user.

Fourth, the method can enable more flexible and compelling user experiences by storing the model on internet cloud servers and allowing portable use of the model from any location, which frees the user from the collocation requirement imposed by conventional AR applications to interact with a room model. For example, users can use portable 3D models while visiting physical stores, on websites, within digital ad units, on the train, at work, at home with their feet up on the couch, or in any other suitable register.

Fifth, variants of the method can leverage conventional smartphones, and do not require specialized hardware (such as VR headsets or high-resolution laser depth sensors) to generate useful models. However, variants of the method can accept specialized hardware outputs to further refine virtual model generation.

Sixth, the method permits the capture of more expansive and immersive fields of view without specialized lenses or cameras, to offer increased perceptual realism, context, and a sense of immersion into the virtual scene (e.g. wide or tall imagery, imagery mimicking human core field of view, imagery mimicking human binocular field of view, 180 degree or 360 degree views, cylindrical or spherical panoramic views, ability to rotate/pan/zoom within a scene, ability to change viewpoint within a scene, etc.).

Seventh, the method achieves special detection and awareness of walls and floors and ceilings, which are dominant planar surfaces with low textures that often cannot be accurately detected by computer vision methods. This can be used for applications involving placing, manipulating, or removing objects from the virtual room model while maintaining the accuracy of the space.

Eighth, the method permits fine segmentation of objects, enabling foreground occlusions, interaction with objects, and the ability to modify the scene. For example, this can enable a user to interactively change the color of wall paint or flooring, place rugs underneath furniture, place items on top of or behind other items, or otherwise modify the virtual model of the physical space.

Ninth, the method estimates lighting from photography and geometry, so that virtual objects can be added to the model and lit in a plausibly realistic manner.

3. SYSTEM

The system, preferably performs the method, including: one or more engines, one or more clients, a platform 110, one or more repositories, and/or any other suitable elements. An example of the system is shown in FIG. 1.

The one or more engines of the system function to perform one or more processes of the method. The engines can include: a stitcher engine 120, a photogrammetry engine 121, a machine learning engine 122, a light estimator engine 125, a feature detector and tracker engine 127, a SLAM engine 103, a computation photography engine 104, a rendering engine 106, a lighting engine 107, and/or any other suitable engine. The one or more engines can be included in the platform and/or the user device 100. The engines can include one or more: rule sets, heuristic sets, neural networks, data, and/or other data construct. Each engine is preferably connected to one or more of the other engines, but can alternatively be isolated. One or more instances of each engine can be executed (e.g., serially, concurrently) for each instance of the method (e.g., for each user, each set of scene data, etc.). One or more instances of the engine can be executed on: the device 100, the platform 110, and/or other processing system. Each engine can perform one or more of the method processes, sub-processes, process variants, and/or other process.

The system can be used with or include one or more device modules, which function to execute one or more method processes. The device modules can include: an end user application 101, a camera sensor controller 102, a platform API 108, such as for interfacing with the platform, an administrator application 109, and/or any other suitable elements. The end user application 101 can be a native application, a browser application, and/or another client.

The device modules are preferably executed by a device 100. The device 100 can function as or include: a capture device (e.g., that captures scene data), a display device, an interaction device (e.g., that receives user inputs), or as any other suitable device. The capture device can include one or more sensors, such as optical sensors (e.g., cameras), depth sensors (e.g., LIDAR, radar, projected light, stereocameras, etc.), inertial sensors (e.g., IMU, gyroscope), light sensors, color temperature sensors, location sensors (e.g., GPS), and/or other sensors. Examples of the device 100 include: smartphones, tablets, smart watches, cameras, and/or other devices.

The system preferably includes a platform no, which can function to determine the virtual model. The platform can include a client API, such as for interfacing with the one or more clients. The platform is preferably remote from the device 100, but can alternatively be part of the device 100. The platform can be hosted by a remote computing system (e.g., server system), a distributed computing system, and/or other computing system.

The system can include one or more datastores, including: a training data datastores, a room imagery datastores, an associated capture data datastores, a model datastores, and/or any other suitable datastores. The datastores can be hosted by the platform 110, by the device 100, and/or other computing system.

4. METHOD

As shown in FIG. 2 and FIG. 3, a method for providing virtual models of indoor scenes can include: capturing scene data S100, determining low-level scene information S200, generating virtual scene information S300, determining high-level scene information S400, determining refined scene information S500, and transmitting the virtual model S600, but can additionally or alternatively include any other suitable elements.

The method functions to generate a dense, accurate virtual model of a scene. The scene can be a physical space, more preferably an indoor space, but (e.g., a room) additionally or alternatively an outdoor space.

The virtual model of the scene can include: one or more virtual scene visual representations (VSVR), a VSVR-aligned geometric representation, plane information, surface normal information, lighting information, and/or other information. The virtual model components are preferably aligned with the VSVR (e.g., aligned to the VSVR coordinate system, to VSVR pixels, or other VSVR reference point), but can misaligned (e.g., within a predetermined margin of error), or otherwise aligned. The virtual model components are preferably dense, but can be semi-dense or sparse.

The virtual scene visual representation (VSVR) represents the visual appearance of the scene from one or more viewpoints (vantage points). The VSVR can be generated from the scene imagery (e.g., with or without the capture data). The VSVR (e.g., immersive photo, interactive panorama, immersive panorama, etc.) is preferably presented to the user, but can be otherwise used. The VSVR is preferably photorealistic, but can additionally or alternatively be immersive, not be photorealistic, or otherwise characterized. The VSVR can be static and/or dynamic (e.g., wherein a user can move between different vantage points, pan within a VSVR, zoom into a VSVR region, etc.). The VSVR preferably has an extended horizontal and/or vertical field of view (e.g., 90° or wider, 115° or wider, between 90° to 120°, a photo sphere, 360-degree photo, etc.), but can have another FOV. Examples of VSVR can include: a single scene image or multiple scene images, with varying fields of view (FOV) (e.g., 57, 90, 180, 270, 280, 290, 300, 310, 320, 330, 340, 350, 360 degrees, etc.); panoramic images (wide and/or tall) represented as planar, cylindrical, or spherical projections (photo sphere), and/or an interactive panorama, an immersive panorama, or any other panorama; free viewpoint walk throughs; VR experiences; or other representations of the visual appearance of a space from one or more viewpoints.

The VSVR-aligned geometric representation functions to represent the geometry of the physical scene. The VSVR-aligned geometric representation is preferably aligned with the VSVR (e.g., shares a common reference point), and can share a field of view (FOV) and/or point of view (POV) with the VSVR. The VSVR-aligned geometric representation preferably includes position data, but can additionally or alternatively include planes, surface normals, masks, and/or other data. The VSVR-aligned geometric representation can include a position for each pixel (and/or a subset thereof) within the VSVR, but can include meshes, convex hulls or other geometric representations. In one example, the VSVR-aligned geometric representation includes a depth map of the VSVR field of view from the VSVR point of view. However, the VSVR-aligned geometric representation can include a point cloud, or include any other suitable geometric representation. The VSVR-aligned geometric representations can additionally or alternatively be otherwise configured or defined.

The plane information functions to represent the planes within the scene. The planes can represent the key planes (e.g., walls, floor, ceiling), object planes, and/or other planes. The plane information can include: plane equations (e.g., defining the plane pose, etc.), plane boundaries, a plane normal vector (e.g., extending normal from the plane body), surface normal and point on the plane, surface normal and orthogonal depth from the device (camera), and/or other plane parameters.

The surface normal information functions to define the orientation of each surface within the scene. The surface normal information can include a surface normal vector (e.g., with a direction and magnitude) for each of a set of VSVR pixels or VS-aligned geometric representation voxel, but can be otherwise defined.

The lighting information functions to define parameters of the scene lighting, such that shadows and highlights can be realistically generated and rendered. The lighting information can include one or more: light source location, light source pose, light source type (e.g., diffuse, collimated, spot lighting), light direction, light parameters (e.g., intensity, color temperature, hue, saturation, etc.), environment maps, intrinsic highlight maps, and/or other information.

The virtual model components can be determined based on scene information or other data. The scene information can include: scene data, scene features, capture device characterization, one or more geometric representations, segmentation masks, surface normals, and/or planes.

The scene data can include scene imagery, associated capture data (e.g., SLAM data, inertial data, light data, depth data, etc.), depth sensor data, and/or any other data sampled by the capture device.

The scene imagery can include still images, video, and/or any other imagery. The scene imagery can depict a scene from one or more vantage points (e.g., POVs). The scene imagery preferably includes RGB imagery, but can additionally or alternatively include other visual channels.

The still images of the scene imagery are preferably high quality, such that each image can include: a predetermined dots per inch (e.g., 250 dpi, 300 dpi, 350 dpi, 400 dpi, etc.), a predetermined width (e.g., 1000 pixels, 2000 pixels, 3000 pixels, 4000 pixels 5000 pixels, etc.), a predetermined length (e.g., 1000 pixels, 2000 pixels, 3000 pixels, 4000 pixels 5000 pixels, etc.), and/or any other characteristic.

The associated capture data can include: poses of the capture device (3D), gravity vector, camera intrinsics (e.g., from manufacturer and based on the currently active photography settings), camera extrinsics (e.g., from the capture device SLAM engine, otherwise determined), camera settings (e.g. shutter speed, aperture, ISO, white balance, focus settings, focus rack motion, etc.), ambient environment data (e.g., audio, etc.), ambient lighting parameters (e.g., ambient brightness, light color temperature, etc.), capture device inertial data (e.g. IMU, gyroscopes, accelerometers, positions, velocities, acclerations, etc.), geolocation, 2D feature points, 3D scene points, planes, objects, a set of scene scan geometric representation(s), a set of additional scene scan geometric representation(s), camera poses, and/or any other suitable data. The associated capture data can be associated with each video frame, each still image, and/or associated with any other image or data.

The scene features can include low-level features, high-level features, and/or other features. The scene features can be generated by the capture device (e.g., by the end user application), by the method, or otherwise generated.

The low-level features (pixel-level features) can include: lines, points, gradients, patches, keypoints, depths, depth-maps, and/or any other suitable features.

The high-level features (contextual features) can include: edges, wall seams, vanishing points, segments, objects, and/or any other suitable features.

The capture device characteristics can include: shutter speed, exposure, lens intrinsics (e.g., intrinsics matrix), sampling rate, sensor versions (e.g., firmware, hardware version, etc.), and/or other characteristics.

The geometric representations function to represent scene geometry, and can include: depth maps (scene geometry from a specific POV), point clouds, and/or any other suitable elements. The method can generate and leverage multiple geometric representations of the scene (e.g., redundant geometric representations of the scene), and selectively fuse different portions of different geometric representations together to generate the final VSVR-aligned geometric representation.

Examples of geometric representations that can be generated and/or used include: scene scan and/or position representations from S120-S150 (e.g., 3D scene points and/or 3D camera poses from SLAM/ARKit/ARCore, etc.; sparse and medium accuracy); depth sensor geometric representation from S220 (e.g., sparse or dense, high accuracy); SLAM geometric representation from S240 (e.g., sparse and medium accuracy); SFM geometric representation from S250 (e.g., dense and high accuracy); dense geometric representation from S260 (e.g., dense and low accuracy); MVS geometric representation from S270 (e.g., semi-dense and high accuracy); a set of outlier removed geometric representations from S280 (e.g., density depends on input geometric representation; higher accuracy); a set geometric representations from S320 (e.g., density and accuracy depends on input geometric representation; aligned with VSVR POV); rough geometric representation from S430 (e.g., dense and medium accuracy); prior-enhanced geometric representation from S520 (e.g., dense and high accuracy); scaled geometric representation from S570 (e.g., dense, scaled, highest accuracy); final geometric representation from S590 (e.g., fused point cloud or depth map; dense, scaled, highest accuracy); and/or other geometric representations of the scene or portions thereof.

The depth maps can include information relating to the depths and/or distances (e.g., along the z-axis) of the scene from a particular vantage point (e.g., camera POV), and can additionally or alternatively include (x, y) coordinates of the objects in the scene.

The point clouds can include (x, y, z) coordinates of points of the scene. The point cloud can collate multiple depth maps into a representation of the scene based on transformation matrices. Each depth map can be determined from the point cloud based on a transformation matrix that projects the points of the point cloud through a virtual lens associated with the vantage point of the depth map. The point cloud can additionally or alternatively be otherwise related to the depth map.

The visual information can include the scene imagery, the updated scene imagery, the VSVR, and/or any other suitable imagery.

Each process and/or sub-process can be performed using one or more of the captured or generated scene information, and output one or more instances (e.g., versions) of the same or different scene information type.

Each process and/or sub-processes of the method can be performed using one or more sets of: rules, heuristics, neural networks, and/or any other suitable algorithm of the same or different type, to generate different versions of the same or different type of data. The data can be generated or processed by one or more modules (e.g., each executing the same or different sets of algorithms or processes).

Portions of the method (or instances of the same subprocess) can generate redundant versions of the same scene information with the same or different: coverage, density, accuracy, precision, or other characteristic.

All or components of the scene information (e.g., point clouds, depth maps, surface normals, etc.) can be: fully dense, dense, semi-dense, sparse, and/or have another density (e.g., along a continuum). Fully dense scene information can include data points for every pixel of the field of view (e.g., frame). Dense scene information (which can overlap with fully dense scene information) can include data points for every pixel or voxel (e.g., above a dense predetermined proportion of the pixels or voxels, such as 90%, 95%, 99%, etc.) of the FOV (e.g., panorama). Semi-dense scene information can have data points for a proportion of points (e.g., pixels or voxels) of the FOV that is between sparse and dense (e.g., within a predetermined range of the pixels or voxels, such as between 10% and 90%, etc.). Sparse scene information can include data points for less than a sparse predetermined proportion of the points within the FOV (e.g., 50%, 40%, 30%, 20%, 10%, 5%, etc.). However, different densities can be otherwise defined.

All or components of the scene information can have high accuracy, medium accuracy, low accuracy, and/or another accuracy (e.g., along a continuum). High accuracy can be less than first predetermined threshold of error (e.g., less than 10%, 5%, 1%, 0.1% error). Medium accuracy can be less than second predetermined threshold of error; between a predetermined error range (e.g., less than 60%, 50%, 40%, 30%, error). Low accuracy can be higher than third predetermined threshold of error (e.g., 40%, 50% 60%, 70% error). However, the accuracies can be otherwise defined.

All or portions of the method can be performed: using depth maps aligned with the VSVR or geometric representations (e.g., depth maps, point clouds) that are independent from the VSVR.

All or portions of the method can be performed: locally on the user device, by a remote computing system (e.g., server system), distributed system, and/or any other suitable computing system.

All or portions of the method can be performed: in series, in parallel, iteratively, or in any other suitable order for one or more user sessions (e.g., sets of scene information).

The captured and/or generated data can be stored: in the same data datastore, different data datastores, or otherwise stored.

4.1 Capturing Scene Data S100

The method preferably includes capturing scene data S100, which functions to generate scene imagery and associated capture data encompassing at least a predetermined field of view from a predetermined number of vantage points (points of view). The scene data can be generated onboard the capture device using one or more of the engines (e.g., SLAM engine, computational photography engine, photogrammetry engine, etc.), the end user application, and/or other engine or module.

S100 is preferably performed before S200 and/or S300, but can additionally or alternatively be performed at any other suitable time, such as after one or more of the method processes to increase the amount of scene data for generating the virtual model. S100 can be performed concurrently and/or serially, by one or more user devices. S100 can be performed using one or more capture methods which can be dependent on or independent from the outputs of other capture methods. The one or more capture methods can be performed using the camera sensor controller, which can function to control aspects of the camera and the resulting scene data (e.g., guiding positioning of the camera, controlling focus, reducing handshake or motion blur, adjusting white balance or color correction, enhancing exposure, aligning images, and any other suitable aspects of the camera). However, S100 can be otherwise performed.

In variants, S100 can include one or more of: providing the user with guidelines to capture imagery from a vantage point S110, generating 3D camera poses and 3D scene points using the SLAM engine S120, capturing scene video by scanning a scene S130, capturing scene images S140, capturing scene data from a second vantage point S150, uploading the scene imagery and associated capture data to the platform S190, and/or any other suitable process.

Providing the user with guidelines to capture imagery from a vantage point S110 functions to determine the scene data based on pre-determined capture process including a predetermined set of camera motion guidelines and/or a random camera motion pattern, and to ensure that the user captures sufficient data for subsequent virtual model generation. S110 can include presenting the set of camera motion guidelines to the user on the user device (e.g., scene FOV coverage, scene POVs, residency time for each scene region, etc.). S110 can include guiding the user through the capture process (e.g., guiding the user though each guideline, such as to ensure the still images of the scene are overlapping, to ensure the video footage is captured from a particular vantage point and/or angle, to ensure high quality associated capture data, etc.).

Generating 3D camera poses and 3D scene points using the SLAM engine S120 functions to determine the SLAM data when moving the user device in a pre-determined configuration (e.g., FIG. 8, circle, square, etc.), such as during S110. However, camera poses and scene points can be otherwise captured in-situ.

Capturing scene video by scanning a scene S130 functions to generate: scene video (e.g., compressed, raw) from one or more vantage points, a set of scene scan geometric representations(s), camera poses, images with parallax, images with a predetermined amount of overlap, threshold number of frames collectively encompassing a predetermined field-of-view (FOV), threshold number of frames collectively encompassing predetermined number of point-of-view (POV), such as for parallax, and/or generate any other suitable information. S130 can be performed based on the 3D camera poses and 3D scene points determined in S120, based on the scene data, and/or based on any other information. S130 can be performed during S120, S110, and/or at another time. S130 can include: processes for achieving sufficient parallax, such as guiding the user to wave the user device to capture two or more perspectives of a scene, wherein each perspective is separated by a predetermined threshold (e.g., 0.5 meters, 1 meter, 2 meters, etc.); processes for capturing enough scene imagery, such as guiding the user to capture scene imagery for a predetermined threshold of time (e.g., 10-20 seconds), guiding the user to capture particular portions of the scene; guiding user video capture based on timers, number of frames, color feedback, 3D data about the room as it is obtained from the SLAM engine, and/or any other suitable feedback element; and/or otherwise guiding video capture. S130 can include sampling video (e.g., a time series of frames), audio, and/or other data. S130 can additionally or alternatively include collecting 3D camera poses for each video frame (or a subset thereof) using the SLAM engine and/or any other suitable element.

Capturing scene images S140 functions to determine still images from one or more vantage points. S140 can optionally additionally include determining one or more camera poses associated with the still images; determining a gravity vector, and/or determining any other suitable information. In a first variant, S140 can include capturing still images of the scene. In a second variant, S140 can include directing the user to move the user device in a specific way to capture scene imagery while filming video (e.g., using the video frames to determine still images; during S130). In a third variant, S140 includes extracting video frames for use as the still images. However, the scene images can be otherwise determined.

Capturing scene data from a second vantage point S150 functions to determine second scene imagery and/or second associated capture data. S150 can be optional. S150 can be repeated one or more times for any number of vantage points (e.g., 1, 2, 3, . . . , n additional vantage points, etc.). The second vantage point preferably is more than a predetermined threshold away from the first vantage point (e.g., 1 meter, 2 meters, 3 meters, 4 meters, 5 meters, 10 meters, etc.), but can alternatively be less than a threshold distance away. S150 can include: facilitating performance of S130 and/or S140 at the second vantage point (e.g., instructing the user to select and move to the second vantage point); additionally or alternatively performing S120 at the second vantage point; and/or any other suitable process.

Uploading the scene data to the platform S190, function to transmit compressed data (e.g., images, video, inertial data, geolocation data, etc.) and/or uncompressed data (e.g., one or more scene data elements, one or more associated data elements, etc.) to the platform (e.g., using the platform API). S190 can be performed based on data collected from one or more S100 processes. S190 can transmit data wirelessly (e.g., over the Internet, over a cellular connection, LAN, etc.), over a wired connection, and/or otherwise transmit the scene data.

4.2 Determining Low-Level Scene Information S200

The method preferably includes determining low-level scene information S200, which functions to extract low-level scene information from the scene data. The low-level scene information can include local, pixel-based features, basic characterizations of the user device and scene, such as including: updated scene imagery (e.g., from S210), geometric features (e.g., from S230), new and/or refined camera pose estimates (e.g., from S250), one or more of the following geometric representations: depth sensor geometric representation (e.g., from S220), SLAM geometric representation (e.g., from S240), dense geometric representation (e.g., from S260), MVS geometric representation (e.g., from S270), a set of outlier removed geometric representations (e.g., from S280), and/or any other geometric representation; and/or other features.

S200 can generate one or more models for a given type of low-level scene information (e.g., multiple depth maps of the scene generated from different processes). Multiple models for a given type of scene information can be redundant (e.g., representative of the same scene, with the same or different densities, accuracies, or other parameters), complimentary, or otherwise related.

S200 can be performed after S100, during S100, after one or more processes of S400, and/or at any other suitable time. S200 can be performed based on the scene data (e.g., all, different subsets thereof, etc.), data generated by other subprocesses of S200, and/or other data. S200 can be performed using one or more extraction algorithms, including: computer vision algorithms, visual feature extractors, photogrammetry processes (e.g., SLAM, SfM, MVS), optical flow, interpolation processes, and/or any other suitable techniques and/or processes.

In variants, S200 can include: processing scene imagery S210, processing depth sensor and/or software depth estimation S220, detecting geometric features S230, determining one or more geometric representations using RGB and/or RGBD SLAM S240, determining one or more geometric representations using structure from motion (SfM) S250, determining dense geometric representations S260, determining one or more geometric representations using multi-view stereo S270, rejecting geometric representation outliers S280, and/or any other suitable process.

Processing scene imagery S210 functions to determine scene imagery that is more suitable for subsequent processing. S210 can be based on the scene imagery determined in S100 and/or any other suitable data. S210 can include processing the scene data, including: denoising, cropping, saturation and hue adjustment, exposure enhancement, sharpening, HDR adjustment, and/or otherwise processing the scene imagery. Additionally or alternatively, S210 can include: identifying and removing bad imagery (e.g., outliers, blurry images), and/or selecting adequate scene imagery for subsequent use (e.g., covering certain parts of the scene, based on a set of rules, thresholds, heuristics, image characteristics, etc.). However, S210 can include any other suitable elements.

Processing depth sensor and/or software depth estimation data S220 functions to determine a depth sensor geometric representation. S220 can be performed based on a depth sensor geometric representation determined from the depth sensor integrated into the user device and/or images and/or video frames from S100. S220 can include: filtering and denoising geometric representations based on known characteristics of the depth sensor; densifying depth sensor data; depth edge sharpening depth sensor data; registering depth sensor data to scene imagery (e.g., visual RGB data of each image and/or frame); using depth sensor intrinsics and extrinsics to project depth data into a point cloud; using the camera intrinsics and extrinsics to project points of a point cloud back into the RGB camera to register the points with RGB images and/or frames to determine a particular depth map; and/or creating geometric meshes from depth sensor data. However, S220 can include any other suitable processes.

Detecting geometric features S230, which can function to determine low-level geometric features including one or more of the following: lines, points, or other geometric or visual features. S230 can be performed using the feature detector and tracker engine 127 or another system. S230 can be performed based on one or more of the following: updated scene imagery from S210, scene imagery and/or associated capture data from S100, and/or any other suitable information. S230 can be performed using optical flow techniques, visual tracking, line extractors, point extractors, visual feature extraction algorithms (e.g., ORB, BRISK, etc.), and/or any other suitable processes. However, geometric features can be otherwise determined.

Determining one or more geometric representations using SLAM S240 functions to determine one or more SLAM geometric representations, 3D camera poses, and/or any other suitable information. SLAM methodologies that can be used include: visual-Inertial SLAM, RGB SLAM RGBD slam, and/or other SLAM engines. S240 can be performed based on scene imagery, associated capture data, and/or any other suitable data. However, S240 can include any other suitable elements.

Determining one or more geometric representations using structure from motion (SfM) S250 functions to determine: 3D points; updated camera poses, which can include updated positions and orientations of the camera for every image and/or frame (or a subset thereof); updated camera intrinsics; and/or other information. S250 can be performed based on: the associated capture data, more specifically camera poses from S100, video, image series, and/or any other scene data or information. S250 can be performed using SfM techniques and/or any other suitable techniques. However, S250 can include any other suitable elements.

Determining dense geometric representations S260 functions to determine one or more dense geometric representations of the scene. S260 can be performed based on: updated scene imagery from S210, scene imagery and/or associated capture data from S100, sparse geometric representations, including one or more scene scan geometric representations from S130, secondary scene scan geometric representations from S150, depth sensor geometric representations from S220 (which can be used in addition to or alternative to SLAM data), RGB and/or RGBD SLAM geometric representation from S240, and/or any other suitable information from another process. S260 can be performed using one or more: neural networks, interpolation techniques (e.g., averaging, bilateral filtering, edge aware smoothing, nearest-neighbor interpolation, Kriging interpolation, spline interpolation, natural neighbor interpolation, Barnes interpolation, bilinear interpolation, triangulation, variational optimization, Poisson or Delaunay surface reconstruction, etc.), and/or any other suitable processes. However, S260 can include any other suitable elements.

Determining one or more geometric representations using multi-view stereo (MVS) S270 functions to determine one or more MVS geometric representations. S270 can be performed based on camera poses, such as the updated camera poses from S250, and/or the camera poses determined in S100; camera intrinsics and/or extrinsics from the scene data and/or from other S200 processes; updated scene imagery from S210 and/or scene imagery from S100; and/or any other suitable information. S270 can be performed using MVS algorithms and/or any other suitable other suitable algorithms. However, S270 can include any other suitable elements.

In variants, S200 can include rejecting geometric representation outliers S280, which can function to determine set of outlier-removed geometric representations by rejecting outlying points from one or more geometric representations. S280 can be performed based on the gravity vector determined in S140, optionally the semantic segmentation determined in S420, and/or any other suitable information. Outliers can be removed from one or more of the geometric representations determined by the method, including: the scene scan position representations from S130, the additional scene scan position representation from S150, the depth sensor geometric representation from S220, the RGB and/or RGBD SLAM geometric representation from S240, the geometric representations from S250, the dense geometric representation from S260, the MVS geometric representations S270, and/or any other suitable geometric representation. S280 can be performed based on a set of rules, heuristics, neural networks, and/or any other suitable algorithm. S280 can include: comparing geometric representations to one or more other geometric representations and rejecting inconsistent points; comparing geometric representations to a high-accuracy geometric representation; and/or any other suitable comparison. S280 can include removing points based on relative depths of the points, such as removing points where depths are not supported because there are no and/or insufficient nearby points, where depths deviate from a known plane (e.g., floor plane), where depths induce visual discrepancies (e.g., color consistency), where depths exceed predetermined thresholds (lie beyond the floor, are greater than a predetermined threshold distance from the camera, such as outside of an estimated scene area), and/or any other process for removing points based on depths. However, S280 can include any other suitable elements.

4.3 Generating Virtual Scene Information S300

The method preferably includes generating virtual scene information S300, which can function to generate virtual scene information including: virtual scene visual representation (VSVR) (e.g., from S310), VS aligned data (e.g., from S320), and/or any other suitable information. S300 can be performed after S100, S250, and/or S400; before S400, S500, and/or S600, in parallel with S260, S270, and/or S280, and/or at any other suitable time. S300 can be performed based on scene imagery from S100, updated scene imagery from S200, camera intrinsics and/or extrinsics, one or more geometric representations determined in S100 and/or S200, and/or any other suitable information. In variants, when S300 is performed after S400, S300 can be performed based on the high-level scene information determined by S400.

In variants, S300 can include: generating the virtual scene virtual representation S310, generating VS aligned data S320, and/or any other suitable element.

Generating the virtual scene virtual representation S310 functions to determine the VSVR, a virtual scene (VS) mapping table (e.g., mapping source pixel in source image to VSVR pixel; mapping source image segments to VSVR segments and transformations, etc.), and/or any other suitable information. S310 can be performed based on the scene imagery from S100, the updated scene imagery from S210, the updated camera poses from S250, camera intrinsics and/or extrinsics, one or more geometric representations determined in S100 and/or S200, optionally the high-level scene information from S400, and/or any other suitable information. S310 can be performed using panorama stitching algorithms and/or any other suitable techniques. Additionally or alternatively, S310 can include any other suitable elements.

Generating VS-aligned data S320 functions to determine one or more: depth maps from the VSVR point of view that are aligned with the VSVR (e.g., wherein each pixel or a subset thereof is associated with a depth value); VS aligned versions of one or more of the inputs to S320; and/or other output. S320 can be performed based on: the VS mapping table, geometric representations from S200 and S100, geometric features from S230, optionally the geometric representation from S590, optionally high-level scene information from S400 (e.g., edges from S410, semantic segmentation from S420), dense depth from S430, surface normals from S440), and/or any other suitable information. S320 can be performed after S100, S200, and/or S400, before S400 and/or S500, wherein subsequent processes can use the VSVR-aligned versions of the respective geometric representations as inputs.

In a first variation, S320 can generate VS-aligned geometric representations by using the VS pixel mapping. In this variant, S320 can include: identifying a pixel in the input geometric representation associated with same source pixel as the VSVR's pixel and assigning the pixel to the VS aligned geometric representation's pixel or voxel that is associated with the respective VSVR's pixel to determine the VS aligned geometric representation. However, the VS-aligned geometric representation can be otherwise determined.

In a second variation, S320 can include re-projecting points from point clouds of the one or more geometric representations (e.g., based on camera intrinsics and extrinsics) through a virtual camera to determine the VS aligned geometric representations. However, S320 can be otherwise performed.

4.4 Determining High-Level Scene Information S400

The method preferably includes determining high-level scene information S400, which functions to determine information that is generated based on scene context (e.g., the entirety of the image, such as the VSVR, scene imagery from S100, and/or updated scene imagery from S200; associated capture data; other features; etc.). High-level scene information can include: high-level geometric features (e.g., from S410), segmentation masks (e.g., from S420), rough geometric representations (e.g., from S430), surface normal values (e.g., from S440), metric scale sparse depths from objects of known size (e.g., from S450), and/or any other suitable information. S400 can be performed before S500, before and/or after S300, and/or at any other suitable time.

Variants of S400 can include: determining high-level geometric features S410, segmenting the scene information S420, determining one or more rough geometric representations S430, determining surface normals S440, determining metric scale sparse depths from objects of known size S450, and/or any other suitable elements. The variants of S400 can be performed in parallel, in series, and/or in any suitable combination. The variants of S400 can be performed based on one or more of the following: virtual scene information from S300 (e.g., VSVR, VSVR-aligned geometric representations, etc.), scene imagery and/or associated capture data from S100, and/or any other suitable information. Generally, the variants of S400 can be performed using neural networks, heuristics, equations, and/or any other suitable process.

Determining high-level geometric features S410 functions to determine high-level geometric features. The high-level geometric features can include: edges (e.g., points at the edge of an object to define where an object ends), wall seams, horizontal lines, vanishing points, and/or any geometric feature. S410 can be performed based on the visual information, one or more geometric representations from one or more of S100, S200, and/or S300, and more specifically, depth maps and/or surface normals of the geometric representations, optionally camera intrinsics and/or extrinsics, and/or any other suitable information. S410 can be performed using: a perceptual edge detector, such as BDCN; a line segment detector, such as LCNN; a multiscale classical line detector, such as MCMLSD, and/or any other suitable detector. Additionally or alternatively, S410 can be performed based on a set of rules, heuristics, neural networks, and/or any other suitable algorithm.

Segmenting the scene information S420 functions to determine segmentation mask(s) for the scene. For example, S420 can determine a class label (e.g., "floor", "wall", "couch", etc.) for every pixel (or a subset thereof) of: the scene imagery (or a subset thereof), the VSVR, the geometric representations (e.g., associated based on the labels determined for source pixels from source images underlying the geometric representation voxel), and/or for any other suitable information. S420 can be performed based on: visual information from S100 and/or S300, the high level geometric features from S410, and/or any other suitable information. S420 can be performed using edge-aware multi-scale neural networks, semantic segmentation techniques, instance segmentation techniques, a set of rules, heuristics, neural networks, and/or any other suitable algorithm.

In a specific example, S420 is performed using an edge-aware multi-scale neural network. The network can process multiple versions of the visual imagery each version having a different resolution, ranging up to 2560×2560, but can additionally or alternatively have resolutions above 2560×2560. The predictions from the multiple versions can be merged using weighted averaging, label-wise-heuristics, and/or any other suitable technique. In variants, higher resolution semantic predictions can receive higher weights near perceptual-edge boundaries and lower weights near non-perceptual-edge regions. However, S420 can include any other suitable elements.

Determining one or more rough geometric representations S430 functions to determine a different geometric representation of the scene (e.g., with different accuracies, densities, and/or noise from other generated geometric representations). The rough geometric representation is preferably dense, but can alternatively be semi-dense, and/or preferably inaccurate, but can alternatively be accurate. For example, the rough geometric representations can include estimated depths per pixel (or a subset thereof) of the visual information. S430 can be performed based on the visual information, optionally camera intrinsics, and/or any other suitable information. S430 can be performed using a monocular depth NNs (e.g., MonodepthBTS), any other suitable neural networks, alternatively a set of rules, heuristics, and/or any other suitable algorithm. However, S430 can include any other suitable elements.

Determining surface normals S440 functions to determine surface normal values for each pixel (or a subset thereof) of the visual information. S440 is preferably performed based on the visual information and can additionally be performed based on the camera intrinsics, and/or any other suitable information. S440 is preferably performed using one or more neural networks, such as Framenet, but can additionally or alternatively, be performed using a set of rules, heuristics, and/or any other suitable algorithm. However, S440 can include any other suitable elements.

Determining metric scale sparse depths from objects of known size S450 functions to determine one or more object depth maps for each known object found in the scene with metric scale depth data for each pixel (or a subset thereof) of the visual information. S400 can be performed based on the visual information, and/or any other suitable information. S400 can include: identifying known objects in the scene, determining known object physical dimensions, scaling the geometric representation (and/or data) based on the known object's relationship with the geometric representation and/or data, and/or computing depths of each object in the scene based on the known object's physical dimensions.

In a first specific example, S450 can include identifying any piece of paper having a standard size (e.g., A4, letter, legal, etc.) and/or a specially designed fiducial marker printed on it, searching the images of the visual information for the known colors and shape of the fiducial marker; identifying the bounds/mask of the marker based on these known colors and shape; determining the identified object's physical dimensions and/or pixel size based on the bounds/mask of the identified marker; and determining one or more object depth maps for each known object based on the physical dimensions.

In a second specific example, S450 can include identifying objects using one or more neural networks trained for object instance recognition; using the identified objects to determine physical dimensions and/or pixel size of the identified objects; and determining one or more object depth maps for each known object based on the physical dimensions and/or pixel size. However, S450 can include any other suitable elements.

4.5 Determining Refined Scene Information S500

The method preferably includes determining refined scene information S500, which functions to synthesize multiple data sources to generate refined scene information (e.g., high accuracy scene information), scale the scene information to a common scale (metric scale), and/or perform any other suitable functionality. The refined scene information can be sent to the user, to other method processes, and/or be otherwise used. The refined scene information can be metric scaled (e.g., to metric units, imperial units, etc.). The refined scene information can include: VSVR aligned geometric representation, refined planes (e.g., refined walls, refined floors, refined ceilings, etc.), refined segmentation masks, lighting information, and/or any other suitable information. S500 is preferably performed after S100, S200, S300, and S400, but can be performed at any other suitable time. S500 is preferably performed based on: the high level scene information from S400, the virtual scene information from S300, the low-level scene information from S200, the Fsegscene imagery and/or associated capture data from S100, and/or any other suitable information. The information used to perform S500 can be scaled and/or unscaled.

In variants, S500 can include: determining floor planes S510, determining prior-enhanced geometric representations S520, refining segmentation masks S530, enhancing occlusion edges S550, determining wall planes S560, adjusting the depth maps to a common scale S570, estimating lighting information S580, generating a final geometric representation S590, and/or any other suitable processes.

Determining floor planes S510 functions to determine plane information for one or more floor planes. The planes can be scaled and/or unscaled. S510 can be performed based on the associated capture data, more specifically the gravity vector from S140, one or more geometric representations, including: the MVS geometric representations (e.g., from S270) and/or the rough geometric representations (e.g., from S430), the segmentation masks (e.g., from S420), and/or any other suitable information. S510 can be performed using random sample consensus (RANSAC) to identify a plane that matches all 3D points which are labeled "floor" in the segmentation masks. S510 can optionally include constraining RANSAC, such as to search for a plane perpendicular to gravity. Additionally or alternatively, S510 can be performed using a set of rules, heuristics, neural networks, and/or any other suitable algorithm. However, S510 can include any other suitable elements.

Determining prior-enhanced geometric representations S520 functions to determine one or more dense geometric representations that are accurate for one or more scene components (e.g., object, floor, wall, labels, surface normals, edges, field of view, etc.). S520 can determine one or more prior-enhanced geometric representations (e.g., with confidence scores on a per-model, per-pixel basis, per-region basis, or other basis). Different S520 models generating different prior-enhanced geometric representations can be optimized for a given scene component or characteristic (e.g., planes; occlusions; etc.), but can additionally or alternatively be optimized for all scene components, optimized for multiple scene components, trained to generate different geometric representations (e.g., redundant geometric representations), and/or otherwise constructed. For example, S530 can determine a floor enhanced geometric representation, an occlusion enhanced geometric representation, and/or any other suitable enhanced geometric representation.

S520 can be performed using one or more neural networks, which can be trained to output a dense geometric representation for a given scene component (e.g., training a wall neural network by penalizing deviation away from a known wall). Each scene component can be associated with one or more neural networks (e.g., wherein multiple neural networks generate redundant versions for the given scene component). Each neural network can be associated with one or more scene components (e.g., configured to generate high-accuracy data for the given scene component).

In a first variation, each neural network can be configured to generate a dense geometric representation for a different scene component, wherein each scene component is associated with one or more neural networks.

In a second variation, one or more neural networks can be configured to generate different a dense geometric representation for a given scene component.

In a third variation, a single neural network can be configured to generate one or more dense geometric representations of the scene.

S520 can be performed based on one or more scene priors. The scene priors preferably include refined scene priors (e.g., from S510, S530-S560), accurate scene priors (e.g., from S100, S200, S300, S400), predetermined scene priors (e.g., a "gold standard" prior or target prior), precursor geometric representations from S100, S200, S300, S400, and/or other scene priors. The scene priors preferably include the most accurate version of a given scene component (or associated reference point, such as a wall seam for a wall) from the previously-determined scene information, but can additionally or alternatively include the average value for the given scene component (e.g., determined from redundant votes or measurements of the scene component) and/or other version of the given scene component. Additionally or alternatively, the scene priors can include any other suitable elements determined by the method. The scene priors can be selected for use based on: a set of rules, heuristics, confidence scores, and/or any other suitable criteria. Different scene priors can be selected for different algorithms (e.g., neural networks), but the scene priors can be otherwise selected.

In examples, the scene priors can include: one or more geometric representations from S100, S200, S300, S400 (predetermined for each neural network, dynamically selected based on a confidence metric, etc.), surface normals from S440, refined planes from all (or a subset thereof) of S510, S560, and/or S570, refined segmentation masks from S530 and S570 and/or unrefined segmentation masks from S420, and/or any other suitable information.

S520 can additionally feed scene imagery, geometric representations, and/or other scene information as inputs into the neural network during inference.

S520 can include biasing the one or more of neural networks with the scene priors during inference (e.g., tending to cause the NNs to generate results as close to the scene prior as possible). Additionally or alternatively, S520 can include: constraining the neural networks with the scene priors during inference, including the scene priors as inputs during inference, and/or otherwise using the scene priors during inference.

In specific examples, S520 can be performed using Alternating-Direction Neural Networks (ADNN), feed forward networks that concatenate the scene priors as an additional input channel (e.g., in addition to scene imagery, geometric representation(s), etc.); late fusion algorithms; recurrent generalizations of feed-forward networks that allow for parameter learning using backpropagation; neural networks that penalize deviations from the scene prior values; neural networks that enforce constraints by treating scene priors as unknown latent variables, wherein the constraints can be injected as input channel, as a side channel (e.g., input into intermediate neural network layer), and/or otherwise injected and/or constrained; and/or other neural networks with other characteristics. Additionally or alternatively, S520 can be performed using any other suitable neural network or module that can include adjusting a penalty during training or inference to target certain characteristics, and/or a set of rules, heuristics, and/or any other suitable algorithm. However, S520 can include any other suitable element.

Refining segmentation masks S530, which can function to determine refined segmentation labels per pixel (or a subset thereof) in one or more models. S530 can be performed based on one or more inputs, including: segmentation masks from S420, one or more prior-enhanced geometric representations from S520 (e.g., segmentation-enhanced geometric representations), one or more geometric representations from S200, surface normals from S440, floor planes from S510 and/or S560, VSVR from S310, and/or any other suitable information. In a specific example, S530 can be performed based on refined planes from S510 and/or S560, one or more prior-enhanced geometric representations from S520, high level information from S400 and/or any other suitable information. In some embodiments, one or more inputs of S530 can be treated as sources of truth for segmentation mask refinement (e.g., high accuracy inputs).

S530 can be performed using techniques to refine segmentation labels, such as using a semantic-segmentation-refiner that functions to refine an initial semantic-segmentation of a geometric feature or scene component (e.g., plane, object) using the geometry of the scene. In one example, the semantic-segmentation-refiner can include refining false positive floor geometric features by considering floor pixels in the segmentation map (e.g., pixels with a high probability of being a floor pixel) with a point-to-feature distance (e.g., height above floor) and/or a normal's deviation that is above a defined threshold; and optionally refining the geometric feature's false negatives using similar heuristics with an inverse logic. In some embodiments, the semantic-segmentation-refiner can include considering superpixels that are grouped using normals, color, and/or other shared characteristics instead of individual pixels. In some embodiments, the semantic-segmentation-refiner optionally includes refining only regions (e.g., contiguous regions, near-contiguous regions that are separated by less than a threshold separation distance or number of pixels) that have high-coverage (e.g., higher than a threshold surface area, proportion of the geometric scene, etc.) with highly reliable geometric representation data (e.g., high accuracy data, such as the S510 output). The geometric features can include: planes (e.g., floors, walls, ceilings), objects, and/or other scene components. Additionally or alternatively, S530 can be performed using a set of rules, heuristics, neural networks, and/or any other suitable algorithm. However, S530 can include any other suitable elements.

Enhancing occlusion edges S550 functions to refine a geometric representation (e.g., depth map, dense depth map) in a way that respects and improves the depth edges it contains. Depth edges are places in the scene where the depth changes abruptly (e.g., change between adjacent pixels or pixel regions exceed a predetermined threshold), but can be otherwise defined. An example of a depth edge includes where the depth of a table drops away sharply at the far edge of the table. S550 can determine one or more edge-enhanced geometric representations, which can include edges of: planes, objects, and/or other scene geometry. S550 can be performed based on: surface normals, the VSVR, a prior-enhanced geometric representation (e.g., from S520), other geometric representations, and/or other scene information. S550 can be performed using: an occlusion-edge-enhancer module; a set of rules; heuristics; neural networks, and/or any other suitable algorithm. The occlusion-edge-enhancer module can enhance a geometric representation (e.g., depth-map) by preserving its edges and smoothing its planar surfaces. In one example, the enhancement corresponds to a guided filter (e.g., on a geometric representation) that uses a dissimilarity cost function where weights leverage normals and surface color consistency (e.g., determined from corresponding pixels from surface normal maps and/or the VRVR, respectively).

Determining wall planes S560 functions to determine: wall plane equations, wall plane instances, and/or other wall plane parameters. S560 can be performed based on one or more of: surface normal values (e.g., from S440), refined segmentation masks (e.g., from S530), floor plane equations (e.g., from S510), gravity (e.g., from S100), visual features (lines, seams, vanishing lines, etc.) (e.g., from S410, S230), geometric representations (e.g., from S200, S520), and/or other scene information. S560 can be determined using: deep learning, image-based 3D geometry, a set of rules, heuristics, neural networks, and/or any other suitable algorithm. In one example, S560 includes: estimating wall plane instances using vertical lines (combining lines from S410 and gravity from S100) and surface normals S440; fusing 3D points from S200 and dense depth S520, optionally under planarity constraints; and deriving initial plane equations for each wall plane instance based on the fused 3D points (e.g., wherein the lines and gravity are aligned, such as pixel-aligned, with the fused 3D points). The initial wall plane equations can then be corrected using vanishing points for the respective wall instance. The respective detected lines (e.g., from S410) and/or gravity (e.g., from S100) can be used to estimate vanishing points for each respective wall instance, but the vanishing lines can be otherwise determined. The resultant wall plane equations for adjacent wall instances are then optionally transformed to be orthogonal to each other (e.g., to be exactly Manhattan) if their estimated plane equations are nearly orthogonal, resulting in an accurate wall orientation for typical indoor room geometries.

S560 can then include determining the wall distance away from the virtual camera (e.g., to scale the plane equations). The wall distance can be determined using one or more methods, depending on the available wall information and/or accuracy of the wall information. In a first example, the scaled geometric representations (e.g., point cloud from S200) can be used to determine the wall distance when the scaled geometric representation includes sufficient points on the wall (e.g., a predetermined number of points in the wall region of the scene, predetermined number of points associated with a "wall" label from the semantic segmentation, etc.). In a second example, the lines associated with a wall-floor intersection (e.g., determined by combining semantic segmentation from S530 with lines from S410) can be used to determine the wall distance by calculating the wall distance based on the wall-floor intersection and the (scaled) floor plane equation (e.g., from S510). In a second example, the lines associated with a wall-wall intersection (e.g., determined by combining semantic segmentation from S530 with lines from S410) can be used to determine the wall distance by calculating the distance of the an unsealed wall using its intersection with an already scaled wall. However, S560 can be otherwise performed.

Adjusting the geometric representations to a common scale S570 functions to scale the geometric representation and plane equations so that they accurately measure the real-world size of the room and the objects it contains (e.g., to metric scale). S570 can be performed after S100, S200, S300, S400, S510 and S520. Can run before or after the other modules in S500. S570 preferably determines one or more scaled geometric representations, and can optionally determine a set of scaled plane equations and/or other scaled scene information. S570 can be determined based on a scale reference, and can scale scene information. The scene information can include: all or a portion of the geometric representations from S100, S200, S300, S400, S500, such as geometric representations from S520 or S550; plane equations (e.g., refined plane equations from S560); and/or other scene information. The scale reference can include: metric scaled 3D points and 3D camera poses (from SLAM); refined camera poses from S250; objects of known size detected in images and/or video frames in S450; scaled depth sensor data; and/or other scale references.

In a first variation, S570 includes scaling the (dense) geometric representations based on common physical points represented in both scaled sensor data and the dense geometric representation. This variation can include: scaling an input geometric representation by matching a set of metric scaled 3D points with points within the input geometric representation; selecting accurate scaled 3D points (e.g., from the SLAM data, from augmented reality engine), identifying corresponding points in the input geometric representation, and calculating an optimal scaling factor based on the 3D point scale and the corresponding points (e.g., using RANSAC); and/or otherwise scaling the geometric representations based on a shared physical point.

In a second variation, S570 includes: determining a transformation that aligns SLAM camera poses which are already metric scaled (e.g., from S120, S130, S140, etc.) with the updated camera poses (e.g., from S250), such as using RANSAC. This transformation can determine the scale, rotation and translation that best aligns the two sets of camera poses (e.g., aligns the poses with the least deviation, least penalty, highest confidence score, etc.). The scale component from the transformation can then be used to scale the input geometric representations and/or plane equations to metric scale.

In a third variation, S570 includes: aligning the geometric representations based on detected known objects, and calculating a transformation based on object's depth and dimensions in the geometric representation and the object's known real-world dimensions. Examples of known objects include: a Coke™ can, printed fiducial markers, generic standard-size piece of paper (e.g., 8½×11" paper), specific known furniture items, and/or other objects.

In a fourth variation, S570 includes: scaling the geometric representations based on depth sensor points, which are associated with scaled depth readings (e.g., metric scaled depth), such as using RANSAC.

However, S570 can be otherwise performed.

Estimating lighting information S580 functions to determine lighting information for the scene, which can enable shadows and shading to be determined and rendered for new virtual objects added to the scene and/or virtual object removal from the scene. S580 can determine lighting information, such as the number of light sources; light source parameters, such as pose (e.g., (x, y, z) position, orientation, etc.), light type (e.g., ambient, point, diffused, etc.; represented as a value wherein each value corresponds to a light type, such as a binary flag for point vs. diffused), size, or other parameters; light parameters, such as lighting intensity, light hue, saturation, color temperature, or other parameters; and/or other lighting information. S580 can be performed based on: the VSVR (e.g., from S310), scene imagery (e.g., from S100), semantic segmentation (e.g., from S420 or S530), and/or other scene information. S580 can be performed by: finding the ambient light condition of the scene (e.g., based on brightness of planes, such as the brightness of the ceiling plane); determining illumination metrics based on the exposure of each image (e.g., exposure of the camera while capturing each source image); determining light source locations of light sources that are turned on (e.g., higher light intensity than surrounding regions); determining area light locations (e.g., based on semantic segmentation, such as window locations; based on shadows and highlights, etc.); determining intrinsic highlights (e.g., pattern on a plane, such as a wall, that is due to light and/or not an object on the wall); determining external lighting information (e.g., from external databases based on the auxiliary capture data, such as the time of day and the position of the sun in the geographic region), and/or otherwise determined. In a specific example, S580 includes estimating ambient lighting by processing image segments that are likely lit by ambient lighting only (e.g. ceiling). The ambient intensity is recovered as the mean value of Value within the HSV color space. S580 can then include determining artificial light sources (e.g., point and directional light sources), using semantic segments associated with light sources (e.g., lamp and window segments, respectively). These segments (e.g., lamp and window segments) are further confirmed to be lights using color analysis within the HSV space. Once the artificial lights are detected, the light parameters can be derived using the full 3D model of the scene.

However, S580 can be otherwise performed.

Optional generating a final geometric representation S590 functions output a high accuracy single geometric representation of the scene. The final geometric representation can be a depth map, a point cloud, and/or other geometric representation. In variants, S590 outputs a VSVR-aligned geometric representation of the scene; alternatively, the final geometric representation can not be VSVR-aligned, and is passed to S320 for VSVR-alignment. S590 can be performed: after S100, S200, S300, S400, the rest of S500; and/or at any other suitable time. S590 can be performed: once per scene; multiple times per scene (e.g., from same or different POV); and/or any number of times for any number of scenes. S590 can be performed based on: high-accuracy scene information (scaled, unsealed), and/or lower-accuracy scene information. Examples of high-accuracy scene information that can be used include: prior-enhanced geometric representations from S520 (e.g., one or more for each scene component); metric scaled geometric representations from S570; metric scaled plane equations from S570; refined segmentation masks from S530; high-accuracy data from S200; the VSVR from S310; and/or any other suitable scene information. S590 can be performed using: late fusion; piecewise fusion (e.g., different scene component pieces from different scene information is selected and fused into the final geometric representation); and/or otherwise performed. In one variation, S590 generates the final geometric representation according to a set of rules and/or a cascade of transformations. In this variation, each input is associated with a different scene component (e.g., that the given input has a high-accuracy-version of), wherein the geometric data for the scene component is extracted from the respective input and fused into the final geometric representation (e.g., by copying the geometric data into the final geometric representation, etc.). However, S590 can be otherwise performed.

4.6 Transmitting the Virtual Model S600

The method preferably includes transmitting the virtual model S600, which can function to package and/or send one or more elements of the refined scene information from S500, as well as the VSVR from S300, for use on the end user application 101. In variants, S600 functions to change the format of the data to generate a compact data package. In variants, S600 functions to change the format of the data to generate an updated package more suitable for use one the end user application 101 (e.g., more compatible with the runtime libraries available in that environment, more efficient to render as 3D graphics, etc.). Shoo can be performed after all of S100-S500, and/or after one or more of S100-S500, and/or at any other suitable time.

In variants, S600 can include determining a data package S610, optionally facilitating manual review S620, transmitting the data package S630, and/or any other suitable processes.

In variants, S600 can include determining a data package S610. S610 can be performed based on one or more final scene information elements, including: the refined scene information from S500 (e.g., VSVR from S310, refined plane equations from S560 and/or S510, refined segmentation masks from S530, final geometric representation from S590/S320, light source from S580, and/or any other suitable elements. Additionally or alternatively, S600 can be performed based on all elements (or a subset thereof) of: the refined scene information from S500, the high-level scene information from S400, the virtual scene information from S300, the virtual scene information from S200, and/or the scene data from S100. The final scene information elements are preferably all metric scaled and aligned with the VSVR, but can additionally or alternatively be aligned with the final geometric representation, unsealed, or otherwise configured.

S610 can include determining a data package that includes the virtual model, which can include compressed, re-encoded and/or raw versions of the elements used to perform S610, an encoded virtual scene visual representation (e.g., wherein the VSVR dimensions can be 4000× 2000±20%, and/or any other suitable dimension), plane equations (e.g., one or more plane rotation matrices), segmentation masks, a fused dense depth map which can be encoded with an encoding scheme, lighting information, and/or any other suitable elements. S610 can be performed based on element selection criteria (e.g., based on the hardware and/or software of a user device). S610 can be performed based on a set of rules, heuristics, neural networks, and/or any other suitable algorithm. However, S610 can include any other suitable elements.

Optionally facilitating manual review S620 functions to manually adjust the scene information. S620 can be performed before S610, before S600, before S630, after S610, and/or at any other suitable time. S620 can be performed for each iteration of the method, in response to a metric satisfying a predetermined condition, and/or at any other suitable time. The metric can be a confidence level, an accuracy level, and/or any other suitable metric. The predetermined condition can be the metric falling below threshold value, and/or any other suitable condition. However, S620 can include any other suitable elements.

Transmitting the data package S630 functions to transmit the data package to one or more user devices (e.g., to the end user application 101), to the model datastore, and/or to any other suitable endpoint. S630 can be performed in response to a scene request receipt (e.g., identifying the data package or the scene), completion of S100-S500, and/or in response to any other suitable event. In a first specific example, the data package is transmitted to one or more user devices in response to receipt of a scene request (e.g., identifying the scene, the user associated with the scene, etc.). In a second example, S600 can include uploading the data package to the remote computing system (e.g., the platform) for subsequent distribution to and/or use on the end user application 101. However, S600 can include any other suitable elements.

5. ILLUSTRATIVE EXAMPLES

In an illustrative example, a method for generating a virtual model representative of a physical scene includes: receiving scene data, captured in-situ within the physical scene; generating a virtual scene visual representation (VSVR) based on the scene data; determining scene information based on the VSVR and the scene data, wherein the scene information includes segmentation masks, wall planes, and a floor plane; generating a plurality of dense depth maps for the physical scene by biasing a set of neural networks, each configured to generate a dense depth map of the plurality, with the scene information as prior knowledge during inference; generating a final segmentation masks, final wall planes, and a final floor plane based on the plurality of dense depth maps; generating a virtual model includes fusing different scene components from the plurality of dense depth maps into the virtual model; and transmitting the VSVR, the virtual model, the final segmentation masks, the final wall planes, and the final floor plane to a user. In an embodiment of this example, the virtual model is aligned with the VSVR and includes a depth for each pixel of the VSVR. In an embodiment of this example, the scene information further includes redundant depth maps, different from the dense depth maps, wherein the redundant depth maps comprise depth maps captured as scene data and depth maps generated using different photogrammatic techniques from the scene data. In an embodiment of this example, the neural networks comprise recurrent feed-forward networks that learn parameters using backpropagation.

In a second illustrative example, a method for generating a virtual model representative of a physical scene includes: receiving scene data, captured in-situ within the physical scene; determining scene information based on the scene data, wherein the scene information includes segmentation masks, wall planes, and a floor plane; generating a plurality dense geometric representations of the physical scene by biasing a set of neural networks, each configured to generate a dense geometric representation of the plurality, with the scene information as prior knowledge during inference; generating a virtual scene visual representation (VSVR) based on the scene data; determining the virtual model, wherein the virtual model includes a physical position for each pixel of the VSVR, wherein the physical position is determined from the plurality of dense geometric representations; and transmitting the VSVR and the virtual model to a user.

In an embodiment of this example, the virtual model is a VSVR-aligned depth map and scaled to standard units.

In an embodiment of this example, the scene data includes a plurality of source images; wherein each pixel in the VSVR is associated with a source pixel in a source image from the plurality of source images; wherein each voxel in each dense geometric representation is associated with a source pixel in a source image from the plurality of source images; wherein each point in the virtual model is associated with a pixel in the VSVR; and wherein each point in the virtual model is associated with a position from a voxel of the dense geometric representations, wherein the voxel shares a common source pixel with the respective VSVR pixel.

In an embodiment of this example, the VSVR is generated before generating the dense geometric representations, wherein the dense geometric representations are generated based on the VSVR.

In an embodiment of this example, determining the scene information includes determining the scene information using a set of photogrammetric techniques, the set of photogrammetric techniques includes at least one of: structure from motion, multi-view stereo, simultaneous localization and mapping, and optical flow.

In an embodiment of this example, determining the scene information includes determining redundant variants of the scene information using different techniques.

In an embodiment of this example, different neural networks of the set are biased with a different one of: the segmentation masks, the wall planes, and the floor plane.

An embodiment of this example further includes transmitting final wall planes, final floor planes, and final segmentation masks to the user. This embodiment can optionally further include generating the final segmentation masks based on the segmentation masks and the dense geometric representations.

In an embodiment of this example, the set of neural networks comprise recurrent alternating direction neural networks.

In an embodiment of this example, determining the virtual model includes fusing different scene components from each of the dense geometric representations into a final dense geometric representation. In this embodiment, each of the dense geometric representations can be aligned with the VSVR, wherein the final dense geometric representation is the virtual model.

An embodiment of this example further includes scaling the dense geometric representations based on a common physical point represented in both scaled sensor data and the dense geometric representation. In this embodiment, the scaled sensor data can optionally include a scaled 3D point generated by an augmented reality engine executing on a capture device, wherein the capture device captures the scene data.

In an embodiment of this example, the dense geometric representations include at least one of: a floor enhanced geometric representation, a wall enhanced geometric representation, and an occlusion enhanced geometric representation.

In an embodiment of this example, the VSVR includes a photorealistic panoramic image.

Figure 8:
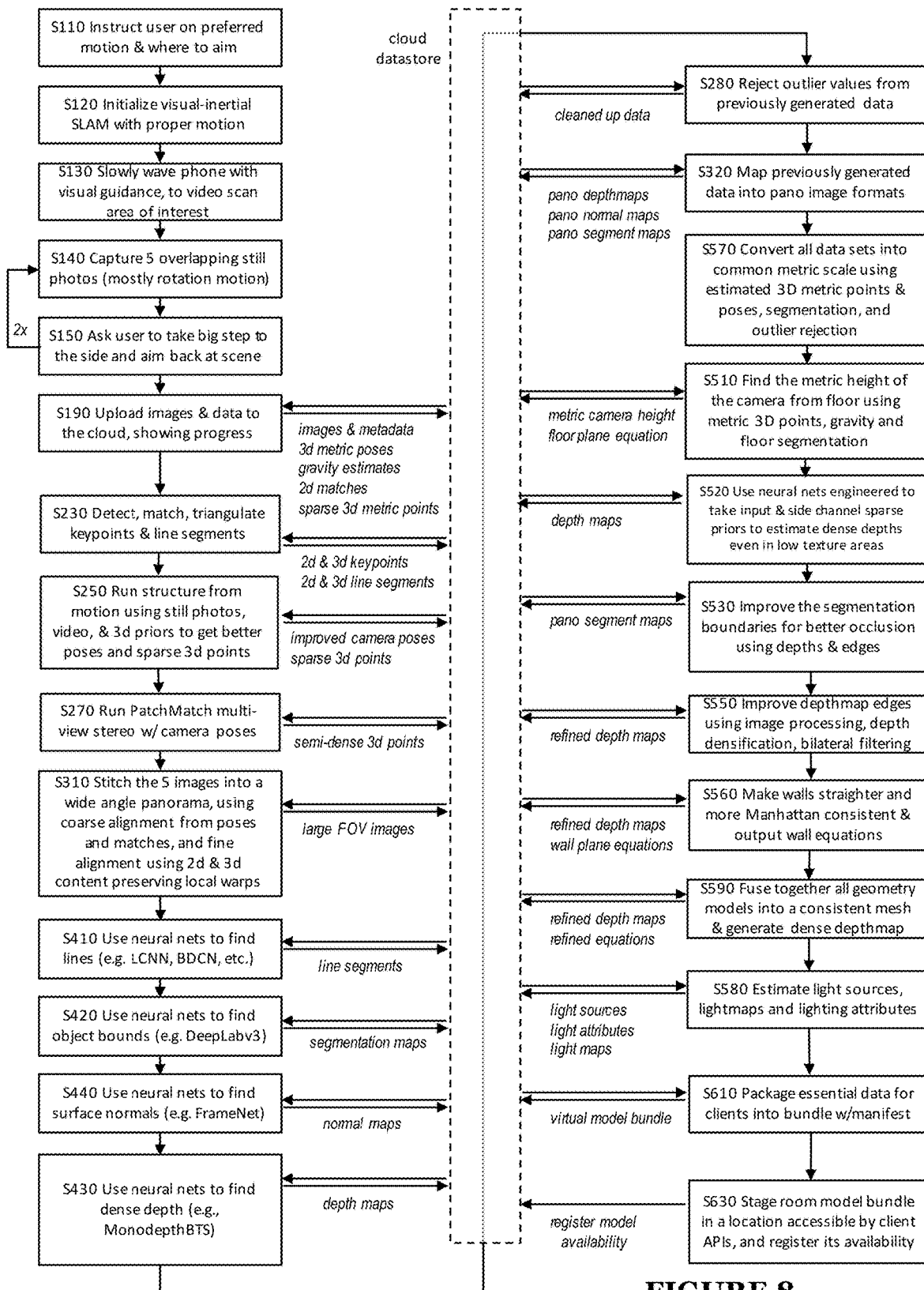
FIG. 8 is an embodiment of the method.

A third illustrative example of the system and/or method is shown in FIG. 8.

In this specific example, the method includes performing specific examples of the following variants in series: S110, S120, S130, iteratively performing S140 and S150 for a predetermined number of vantage points, S190, S230, S250, S270, S310, S410, S420, S440, S430, S280, S320, S570, S510, S530, S550, S650, S590, S580, S610, and S630.

In particular, the specific example of the method can include (with specific examples of the variants of S100): instructing a user on preferred motion of the device and where to aim the device S110; initializing RGB and/or RGBD SLAM with proper device motion S120; instructing the user to slowly wave the device with visual guidance to scan an area of interest (e.g., video) S130; capturing 5 overlapping still photos (mostly rotation motion) S140; asking the user to take big step to the side and aim the device back at scene S150; and uploading the images and data (e.g., metadata, 3D metric poses, gravity estimates 2D matches, sparse 3D metric points, etc.) to the datastore S190 and showing upload progress.

The specific example of the method can additionally include (with specific examples of the variants of S200): detecting, matching, and/or triangulating keypoints and line segments S230 (e.g., reading and/or writing 2D and 3D keypoints and/or line segments to the datastore); running structure from motion using still photos, video, and 3D priors to get better poses and sparse 3D points S250 (e.g., reading and/or writing improved camera poses and sparse 3D points to the datastore); running PatchMatch multi-view stereo with camera poses S270 (e.g., reading and/or writing semi-dense 3D points to the datastore); and rejecting outlier values from previously generated data S280 (e.g., reading noisy data from and writing cleaned up data to the datastore).

The specific example of the method can additionally include (with specific examples of the variants of S300): stitching the 5 images into a wide angle panorama, using coarse alignment from poses and matches, and fine alignment using 2D and 3D content preserving local warps S310 (e.g., reading images from and writing large FOV images to the datastore); and mapping previously generated data into panorama image formats S320 (e.g., reading data from and writing panoramic depthmaps, panoramic normal maps, and panoramic segment maps to the datastore).

The specific example of the method can additionally include (with specific examples of the variants of S400): using neural networks to find lines (e.g. LCNN, BDCN, etc.) S410 (e.g., reading images and other data from and writing line segments to the datastore); using neural networks to find object bounds (e.g. DeepLabv3) S420 (e.g., reading images and other data from and writing segmentation maps to the datastore); using neural nets to find dense depth (e.g., MonodepthBTS) S430 (e.g., reading images and other data and writing depth maps to the datastore); and using neural networks to find surface normals (e.g. FrameNet) S440 (e.g., reading images and other data from and writing normal maps to the datastore).

The specific example of the method can additionally include (with specific examples of the variants of S500): finding the metric height of the camera from floor using metric 3D points, gravity vectors, and floor segmentation S510 (e.g., reading depth maps and capture data from and writing metric camera heights and floor plane equation to the datastore); using neural networks engineered to take input and side channel sparse priors to estimate dense depths even in low texture areas S520 (e.g., reading images and other data from and writing depth maps to the datastore); improving the segmentation boundaries for better occlusion using depths and edges S530 (e.g., reading segment maps from and writing improved panoramic segment maps to the datastore); improving depthmap edges using image processing, depth densification, bilateral filtering S550 (e.g., reading depth maps from and writing refined depth maps to the datastore); making walls straighter and more Manhattan consistent and can output wall equations S560 (e.g., reading images and other data from and writing refined depth maps and wall plane equations to the datastore); converting all data sets into common metric scale using estimated 3D metric points & poses, segmentation, and outlier rejection S570; estimating light sources, lightmaps and lighting attributes S580 (e.g., reading images and other data from and writing light sources, light attributes, and light maps to the datastore); and fusing together all geometry models into a consistent mesh and generating a dense depthmap S590 (e.g., reading depth maps and equations from and writing refined depth maps and refined equations to the datastore).

The specific example of the method can additionally include (with specific examples of the variants of S600): packaging essential data for clients into bundle with a manifest S610 (e.g., reading the refined and fused information from and writing the virtual model bundle to the datastore); and staging room model bundle in a location accessible by client APIs and registering its availability S630 (e.g., registering the model availability in the datastore).

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method executed by one or more computing devices for generating a virtual representation of a physical scene, the method comprising:
   receiving scene data corresponding to the physical scene;
   processing the scene data to determine a plurality of scene components and a plurality of scene priors corresponding to the plurality of scene components, wherein the plurality of scene priors comprise a plurality of semantic segmentation masks and wherein processing the scene data comprises applying semantic segmentation to the scene data to generate a plurality of semantic segmentation masks, each semantic segmentation mask mapping a group of pixels in the scene data to a semantic label;
   generating a plurality of dense geometric representations by inputting the plurality of scene priors into one or more neural networks trained to generate dense geometric representations, wherein each dense geometric representation corresponds to a scene component in the plurality of scene components;

generating a virtual model of the physical scene based at least in part on the plurality of dense geometric representations; and generating a virtual representation of the physical scene based at least in part on the scene data, the virtual representation being aligned with the virtual model.

2. The method of claim 1, wherein the one or more neural networks comprise a plurality of neural networks.

3. The method of claim 2, wherein each neural network in the plurality of neural networks is trained to generate a dense geometric representation of a different scene component than the other neural networks in the plurality of neural networks.

4. The method of claim 1, wherein processing the scene data to determine a plurality of scene components and a plurality of scene priors corresponding to the plurality of scene components further comprises one or more of:

generating a plurality of geometric representations corresponding to the plurality of scene components;

determining geometric features corresponding to the scene data, the geometric features comprising one or more of: edges, wall seams, horizontal lines, or vanishing points; or determining surface normals of one or more scene components in the plurality of scene components.

5. The method of claim 4, wherein generating a plurality of geometric representations corresponding to the plurality of scene components comprises one or more of:

generating one or more geometric representations in the plurality of geometric representations using a simultaneous localization and mapping (SLAM) algorithm;

generating one or more geometric representations in the plurality of geometric representations using a structure from motion (SfM) algorithm;

generating one or more geometric representations in the plurality of geometric representations using multi-view stereo; or generating one or more rough geometric representations.

6. The method of claim 1, wherein the scene priors further comprise one or more of:

one or more geometric representations;
one or more geometric features;
one or more surface normals;
one or more floor planes;
one or more wall planes;
one or more edges;
one or more model versions of one or more scene components; or
one or more average versions of one or more scene components.

7. The method of claim 1, wherein generating a virtual representation of the physical scene based at least in part on the scene data comprises:

generating a virtual representation of the physical scene based at least in part on the scene data and the virtual model.

8. An apparatus for generating a virtual representation of a physical scene, the apparatus comprising:

one or more processors; and
one or more memories operatively coupled to at least one of the one or more processors and having instructions stored thereon that, when executed by at least one of the one or more processors, cause at least one of the one or more processors to:

receive scene data corresponding to the physical scene;

process the scene data to determine a plurality of scene components and a plurality of scene priors corresponding to the plurality of scene components, wherein the plurality of scene priors comprise a plurality of semantic segmentation masks and wherein processing the scene data comprises applying semantic segmentation to the scene data to generate a plurality of semantic segmentation masks, each semantic segmentation mask mapping a group of pixels in the scene data to a semantic label;

generate a plurality of dense geometric representations by inputting the plurality of scene priors into one or more neural networks trained to generate dense geometric representations, wherein each dense geometric representation corresponds to a scene component in the plurality of scene components;

generate a virtual model of the physical scene based at least in part on the plurality of dense geometric representations; and generate a virtual representation of the physical scene based at least in part on the scene data, the virtual representation being aligned with the virtual model.

9. The apparatus of claim 8, wherein the one or more neural networks comprise a plurality of neural networks.

10. The apparatus of claim 9, wherein each neural network in the plurality of neural networks is trained to generate a dense geometric representation of a different scene component than the other neural networks in the plurality of neural networks.

11. The apparatus of claim 8, wherein the instructions that, when executed by at least one of the one or more processors, cause at least one of the one or more processors to process the scene data to determine a plurality of scene components and a plurality of scene priors corresponding to the plurality of scene components further cause at least one of the one or more processors to perform one or more of:

generating a plurality of geometric representations corresponding to the plurality of scene components;

determining geometric features corresponding to the scene data, the geometric features comprising one or more of: edges, wall seams, horizontal lines, or vanishing points; or determining surface normals of one or more scene components in the plurality of scene components.

12. The apparatus of claim 11, wherein the instructions that, when executed by at least one of the one or more processors, cause at least one of the one or more processors to generate a plurality of geometric representations corresponding to the plurality of scene components further cause at least one of the one or more processors to perform one or more of:

generating one or more geometric representations in the plurality of geometric representations using a simultaneous localization and mapping (SLAM) algorithm;

generating one or more geometric representations in the plurality of geometric representations using a structure from motion (SfM) algorithm;

generating one or more geometric representations in the plurality of geometric representations using multi-view stereo; or generating one or more rough geometric representations.

13. The apparatus of claim 8, wherein the scene priors further comprise one or more of:

one or more geometric representations;
one or more geometric features;
one or more surface normals;
one or more floor planes;
one or more wall planes;
one or more edges;
one or more model versions of one or more scene components; or
one or more average versions of one or more scene components.

14. The apparatus of claim 8, wherein the instructions that, when executed by at least one of the one or more processors, cause at least one of the one or more processors to generate a virtual representation of the physical scene based at least in part on the scene data further cause at least one of the one or more processors to:
generate a virtual representation of the physical scene based at least in part on the scene data and the virtual model.

15. At least one non-transitory computer-readable medium storing computer-readable instructions for generating a virtual representation of a physical scene that, when executed by one or more computing devices, cause at least one of the one or more computing devices to:
receive scene data corresponding to the physical scene;
process the scene data to determine a plurality of scene components and a plurality of scene priors corresponding to the plurality of scene components, wherein the plurality of scene priors comprise a plurality of semantic segmentation masks and wherein processing the scene data comprises applying semantic segmentation to the scene data to generate a plurality of semantic segmentation masks, each semantic segmentation mask mapping a group of pixels in the scene data to a semantic label;
generate a plurality of dense geometric representations by inputting the plurality of scene priors into one or more neural networks trained to generate dense geometric representations, wherein each dense geometric representation corresponds to a scene component in the plurality of scene components;
generate a virtual model of the physical scene based at least in part on the plurality of dense geometric representations; and
generate a virtual representation of the physical scene based at least in part on the scene data, the virtual representation being aligned with the virtual model.

16. The at least one non-transitory computer-readable medium of claim 15, wherein the one or more neural networks comprise a plurality of neural networks.

17. The at least one non-transitory computer-readable medium of claim 16, wherein each neural network in the plurality of neural networks is trained to generate a dense geometric representation of a different scene component than the other neural networks in the plurality of neural networks.

18. The at least one non-transitory computer-readable medium of claim 15, wherein the instructions that, when executed by at least one of the one or more computing devices, cause at least one of the one or more computing devices to process the scene data to determine a plurality of scene components and a plurality of scene priors corresponding to the plurality of scene components further cause at least one of the one or more computing devices to perform one or more of:
generating a plurality of geometric representations corresponding to the plurality of scene components;
determining geometric features corresponding to the scene data, the geometric features comprising one or more of: edges, wall seams, horizontal lines, or vanishing points; or
determining surface normals of one or more scene components in the plurality of scene components.

19. The at least one non-transitory computer-readable medium of claim 18, wherein the instructions that, when executed by at least one of the one or more computing devices, cause at least one of the one or more computing devices to generate a plurality of geometric representations corresponding to the plurality of scene components further cause at least one of the one or more computing devices to perform one or more of:
generating one or more geometric representations in the plurality of geometric representations using a simultaneous localization and mapping (SLAM) algorithm;
generating one or more geometric representations in the plurality of geometric representations using a structure from motion (SfM) algorithm;
generating one or more geometric representations in the plurality of geometric representations using multi-view stereo; or
generating one or more rough geometric representations.

20. The at least one non-transitory computer-readable medium of claim 15, wherein the scene priors further comprise one or more of:
one or more geometric representations;
one or more geometric features;
one or more surface normals;
one or more floor planes;
one or more wall planes;
one or more edges;
one or more model versions of one or more scene components; or
one or more average versions of one or more scene components.

21. The at least one non-transitory computer-readable medium of claim 15, wherein the instructions that, when executed by at least one of the one or more computing devices, cause at least one of the one or more computing devices to generate a virtual representation of the physical scene based at least in part on the scene data further cause at least one of the one or more computing devices to:
generate a virtual representation of the physical scene based at least in part on the scene data and the virtual model.

* * * * *